US011863291B2

(12) United States Patent
Hwang et al.

(10) Patent No.: US 11,863,291 B2
(45) Date of Patent: Jan. 2, 2024

(54) MANAGEMENT OF CELL MEASUREMENT

(71) Applicant: LG ELECTRONICS INC., Seoul (KR)

(72) Inventors: Jinyup Hwang, Seoul (KR); Oanyong Lee, Seoul (KR); Jinwoong Park, Seoul (KR); Yoonoh Yang, Seoul (KR); Sangwook Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/162,560

(22) Filed: Jan. 31, 2023

(65) Prior Publication Data

US 2023/0179293 A1   Jun. 8, 2023

Related U.S. Application Data

(63) Continuation of application No. PCT/KR2022/010710, filed on Jul. 21, 2022.

(30) Foreign Application Priority Data

Jul. 23, 2021   (KR) .......................... 10-2021-0097278

(51) Int. Cl.
*H04B 7/185* (2006.01)
(52) U.S. Cl.
CPC ................. *H04B 7/18513* (2013.01)
(58) Field of Classification Search
CPC .......................................... H04B 7/185–195
See application file for complete search history.

(56) References Cited

U.S. PATENT DOCUMENTS 10,848,237 B1 * 11/2020 Sorond .............. H04B 7/18523
11,095,361 B2 * 8/2021 Eichen .................. H04W 16/14
(Continued)

FOREIGN PATENT DOCUMENTS

WO   2020231123   11/2020

OTHER PUBLICATIONS

LG Electronics Inc, Cell reselection based on time and location condition, May 19-27, 2021, R2-2105786 (Year: 2021).*
(Continued)

*Primary Examiner* — Raymond S Dean
(74) *Attorney, Agent, or Firm* — LEE, HONG, DEGERMAN, KANG & WAIMEY PC

(57) ABSTRACT

A disclosure of this specification provides a method for radio communication, performed by user equipment (UE). The method is comprising: connecting to a non-terrestrial network (NTN) satellite serving a targeted service area via a service link, wherein the NTN satellite is connected to a gateway via a feeder link; receiving, from the NTN satellite, information on service time of a serving cell; starting to perform neighbor cell measurement at a time point before end of the service time of the serving cell by a certain time, regardless of whether a cell quality of the serving cell meets a cell selection criterion S, wherein the NTN satellite provides an earth fixed system, wherein the information on the service time includes information on when the serving cell is going to stop serving the targeted service area, wherein the information on the service time is provided based on a Coordinated Universal Time.

11 Claims, 21 Drawing Sheets

(56) References Cited

U.S. PATENT DOCUMENTS

| | | | | |
|---|---|---|---|---|
| 2008/0287124 A1* | 11/2008 | Karabinis | .......... | H04B 7/18536 |
| | | | | 455/13.1 |
| 2018/0098253 A1* | 4/2018 | Huang | .............. | H04W 36/0088 |
| 2019/0075585 A1* | 3/2019 | Deogun | ................ | H04W 72/23 |
| 2020/0178135 A1* | 6/2020 | Yun | ................... | H04W 36/0061 |
| 2022/0030532 A1* | 1/2022 | Hajir | ................. | H04B 7/18513 |

OTHER PUBLICATIONS

PCT International Application No. PCT/KR2022/010710 International Search Report dated Oct. 25, 2022, 2 pages.
LG Electronics Inc., "Cell reselection based on time and location condition," 3GPP TSG-RAN WG2 Meeting #114-e, R2-2105786, May 2021, 6 pages.
Huawei et al., "WF for CHO in NTN," 3GPP TSG RAN WG2 #113b-e, R2-2103632, Apr. 2021, 8 pages.
LG Electronics Inc., "Further considerations on NTN CHO," 3GPP TSG-RAN WG2 Meeting #114-e, R2-2105787, May 2021, 4 pages.
LG Electronics Inc., "Connected mode enhancements in NTN," 3GPP TSG-RAN WG2 Meeting #113bis-e, R2-2103308, Apr. 2021, 5 pages.

\* cited by examiner

MANAGEMENT OF CELL MEASUREMENT

CROSS-REFERENCE TO RELATED APPLICATION(S)

This application is a continuation of International Application No. PCT/KR2022/010710 filed on Jul. 21, 2022, which claims the benefit of earlier filing date and right of priority to Korean Patent Application No. 10-2021-0097278, filed on Jul. 23, 2021, the contents of all of which are hereby incorporated by reference herein in their entireties.

TECHNICAL FIELD

The present disclosure relates to mobile communication.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

In NTN communication, signal quality is similar over almost all location of a cell. Therefore, cell measurement based on signal quality is inefficient for power saving.

SUMMARY

In accordance with an embodiment of the present disclosure, a disclosure of this specification provides a method for radio communication, by performed user equipment (UE). The method is comprising: receiving a first service time of serving cell and a first time threshold for the serving cell from a base station; calculating a first remaining service time (RST) of the serving cell, based on the first service time; performing cell measurement based on comparing the first RST with the first time threshold.

The present disclosure can have various advantageous effects.

For example, by performing cell measurement based on service time or reference location, power saving for UE is efficiently performed.

Advantageous effects obtained through specific examples of the present specification are not limited to the effects listed above. For example, there may be a variety of technical effects that a person having ordinary skill in the related art can understand or derive from this specification. Accordingly, the specific effects of the present disclosure are not limited to those explicitly described herein, but may include various effects that may be understood or derived from the technical features of the present disclosure.

DETAILED DESCRIPTION

Figure 1:
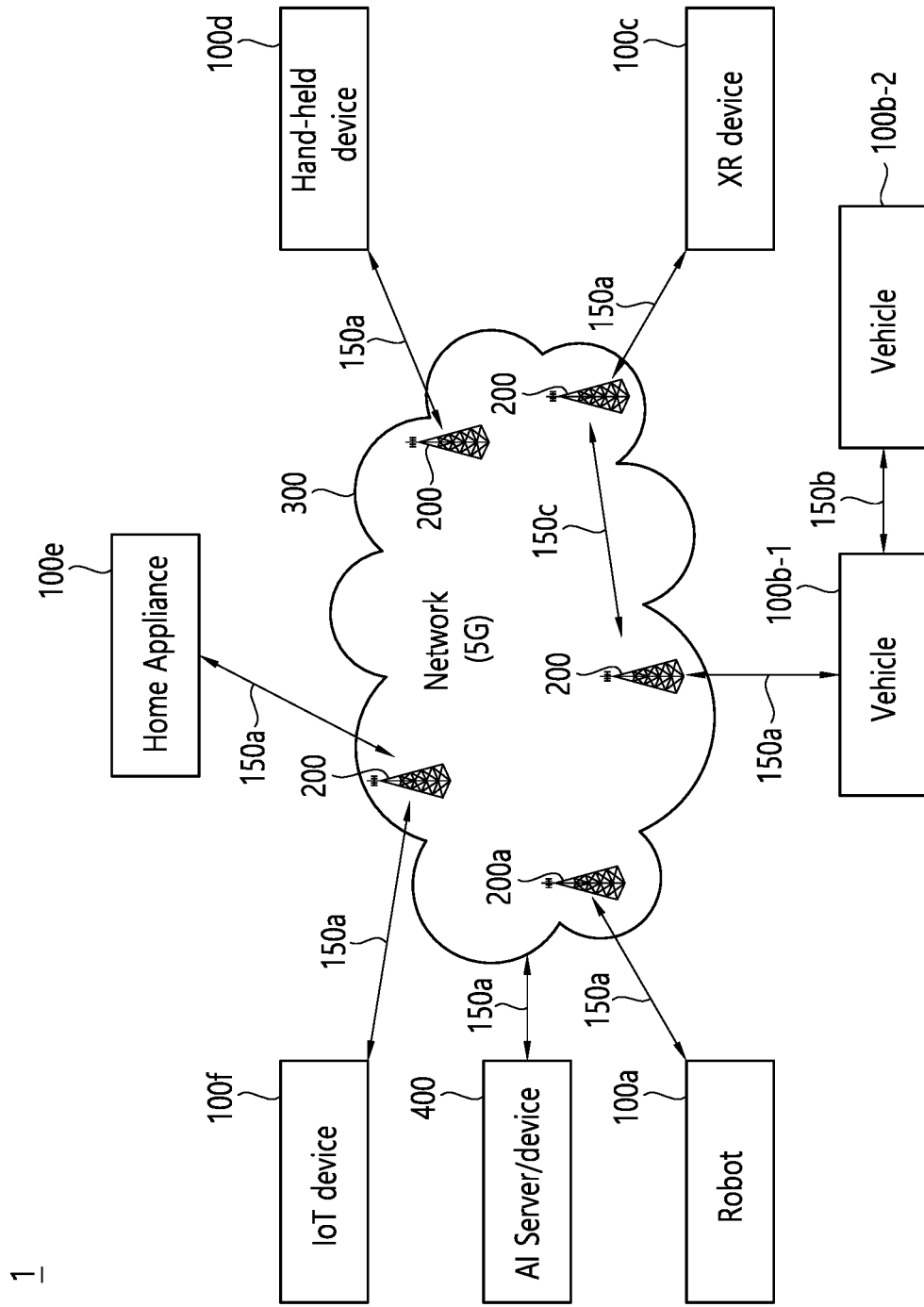
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC- FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. Evolution of 3GPP LTE includes LTE-A (advanced), LTE-A Pro, and/or 5G NR (new radio).

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information"

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHZ | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHZ | 60, 120, 240 kHz |

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
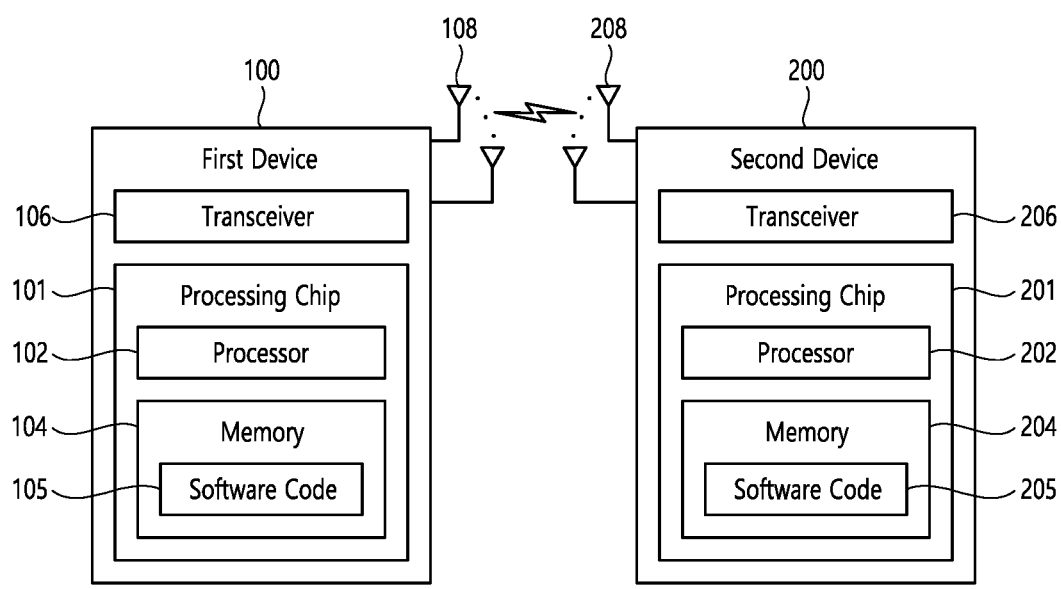
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be configured to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be configured to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
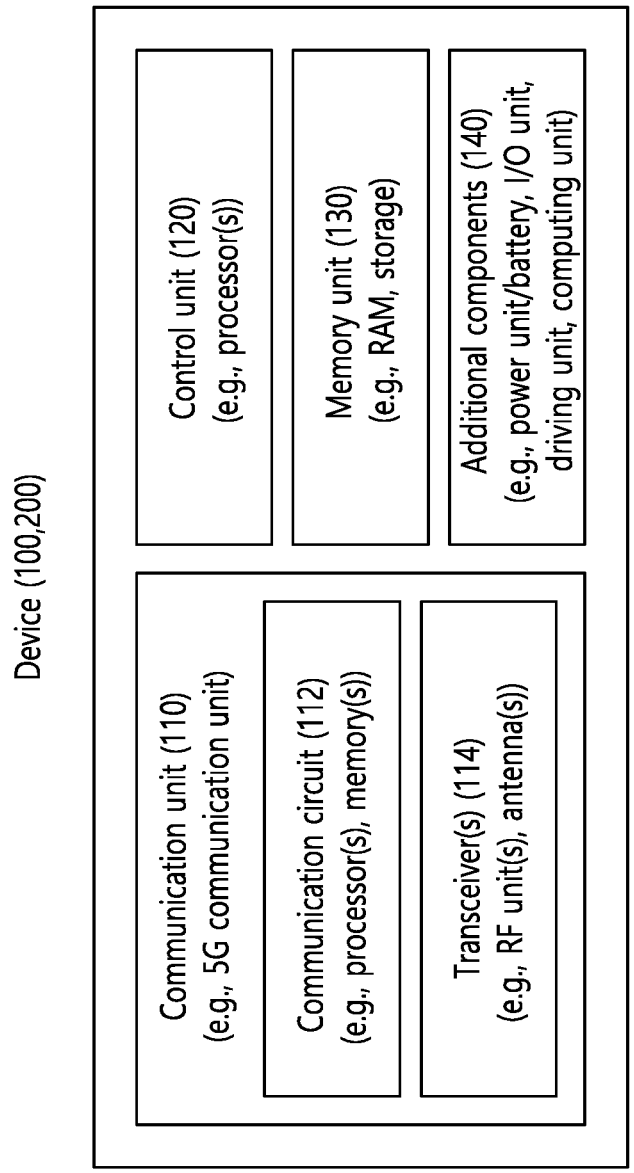
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory unit 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory unit 130 may be configured by a RAM, a DRAM, a ROM, a flash memory, a volatile memory, a non-volatile memory, and/or a combination thereof.

Figure 4:
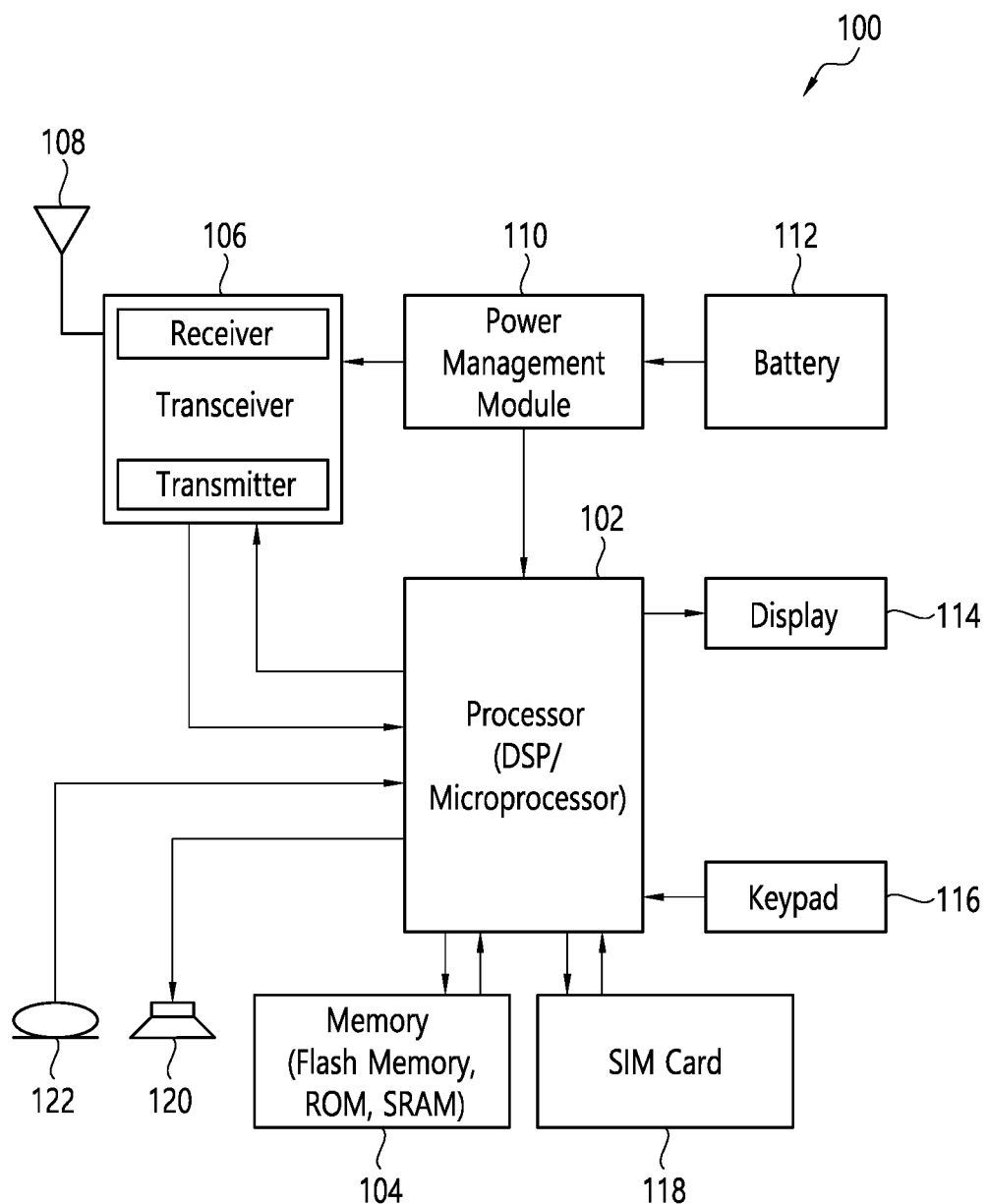
FIG. 4 shows an example of UE to which implementations of the present disclosure is applied.

FIG. 4 shows an example of UE to which implementations of the present disclosure is applied.

Referring to FIG. 4, a UE 100 may correspond to the first wireless device 100 of FIG. 2 and/or the wireless device 100 or 200 of FIG. 3.

A UE 100 includes a processor 102, a memory 104, a transceiver 106, one or more antennas 108, a power management module 110, a battery 112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, a series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 116 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 5:
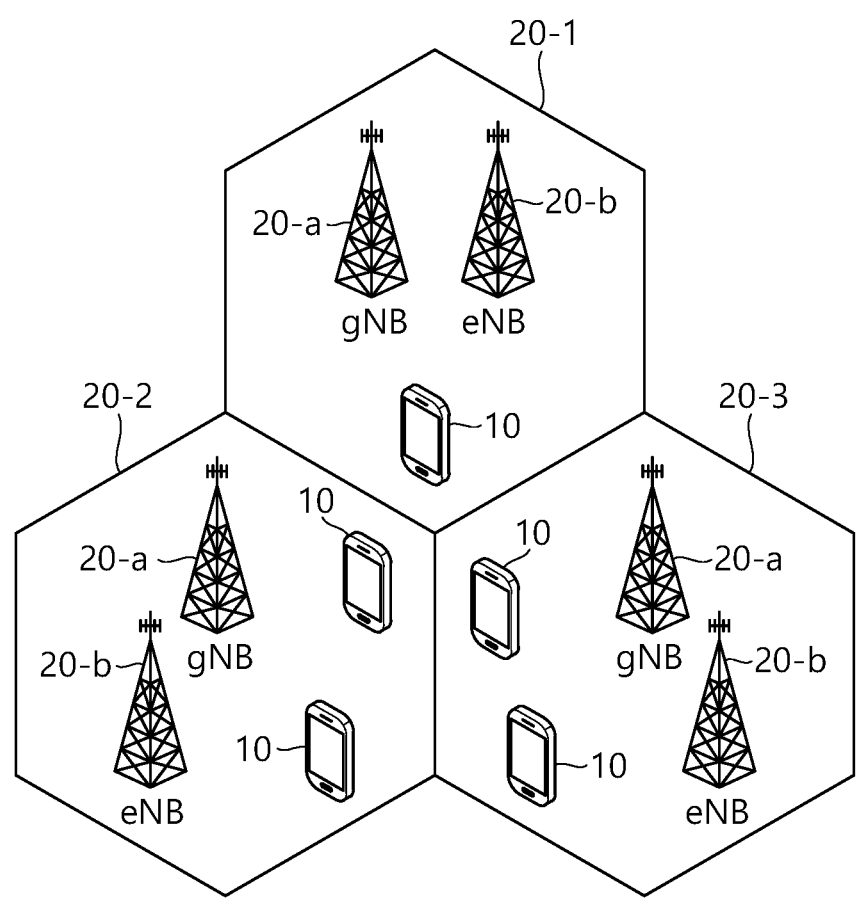
FIG. 5 is an example of a wireless communication system.

FIG. 5 is an example of a wireless communication system.

As can be seen with reference to FIG. 5, a wireless communication system includes at least one base station (BS). The BS is divided into a gNodeB (or gNB) 20a and an eNodeB (or an eNB) 20b. The gNB 20a supports 5G mobile communication. The eNB 20b supports 4G mobile communication, that is, long term evolution (LTE).

Each base station 20a and 20b provides a communication service for a specific geographic area (generally referred to as a cell) (20-1, 20-2, and 20-3). A cell may be again divided into a plurality of regions (referred to as sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Figure 6:
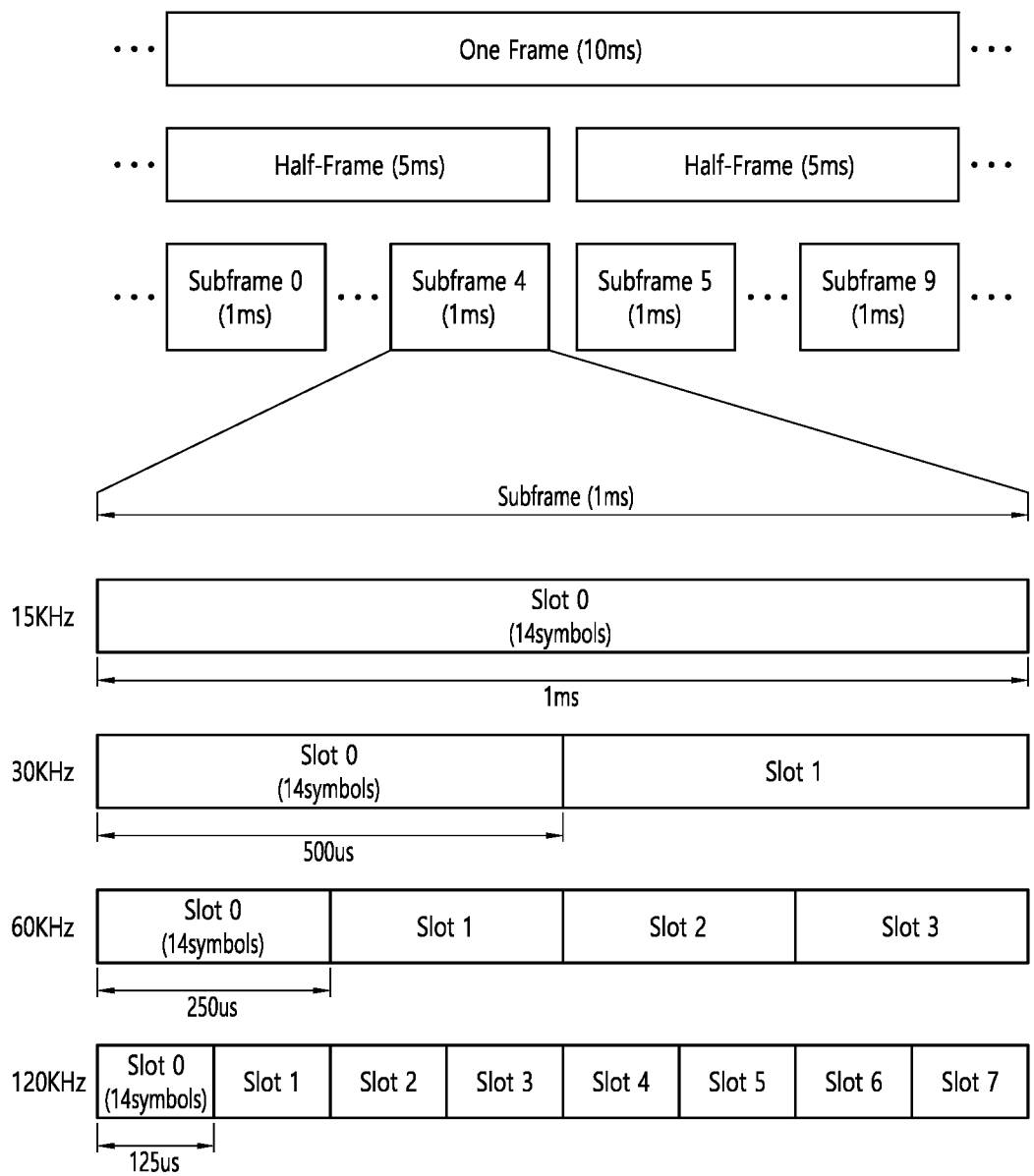
FIG. 6 illustrates a structure of a radio frame used in NR.

FIG. 6 illustrates a structure of a radio frame used in NR.

In NR, uplink and downlink transmission are composed of frames. The radio frame may have a length of 10 ms and may be defined as two 5-ms half-frames (HFs). Each half-frame may be defined as five 1-ms subframes (SFs). A subframe may be divided into one or more slots, and the number of slots in a subframe may depend on SCS (Subcarrier Spacing). Each slot may include 12 or 14 OFDM(A) symbols according to a cyclic prefix (CP). In some implementations, if a CP is used, then each slot contains 14 symbols. If an extended CP is used, then each slot contains 12 symbols. The symbol may include, for example, an OFDM symbol (or a CP-OFDM symbol) and an SC-FDMA symbol (or a DFT-s-OFDM symbol.

Figure 7:
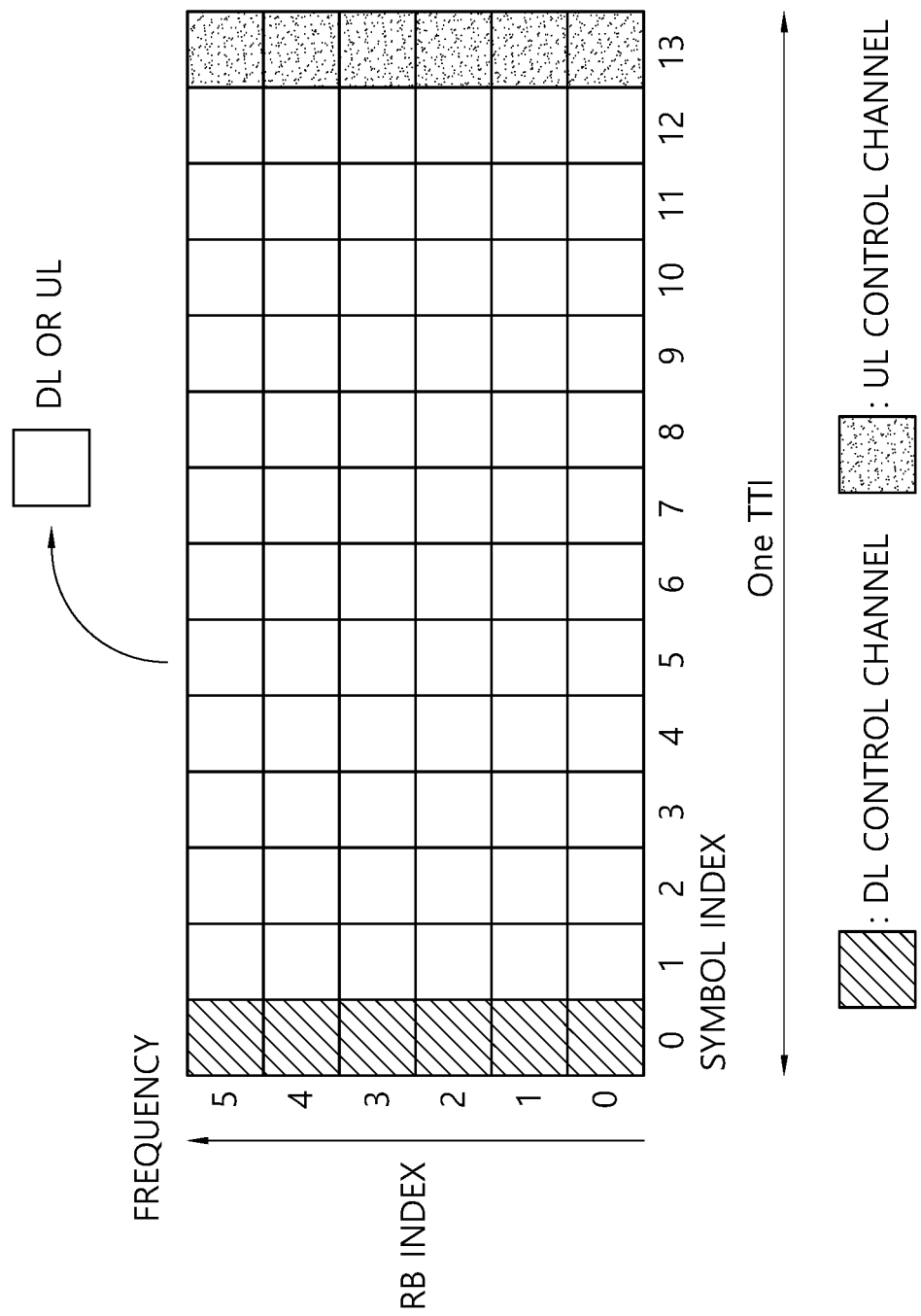
FIG. 7 shows an example of subframe type in NR.

FIG. 7 shows an example of subframe type in NR.

A transmission time interval (TTI) shown in FIG. 7 may be called a subframe or slot for NR (or new RAT). The subframe (or slot) in FIG. 7 may be used in a TDD system of NR (or new RAT) to minimize data transmission delay. As shown in FIG. 7, a subframe (or slot) includes 14 symbols as does the current subframe. A front symbol of the subframe (or slot) can be used for a downlink control channel, and a rear symbol of the subframe (or slot) can be used for a uplink control channel. Other channels can be used for downlink data transmission or uplink data transmission. According to such structure of a subframe (or slot), downlink transmission and uplink transmission may be performed sequentially in one subframe (or slot). Therefore, a downlink data may be received in the subframe (or slot), and a uplink acknowledge response (ACK/NACK) may be transmitted in the subframe (or slot).

A subframe (or slot) in this structure may be called a self-constrained subframe.

Specifically, first N symbols in a slot may be used to transmit a DL control channel (hereinafter, DL control region), and last M symbols in a slot may be used to transmit a UL control channel (hereinafter, UL control region). N and M are each an integer greater than or equal to 0. A resource region (hereinafter, referred to as a data region) between the DL control region and the UL control region can be used for DL data transmission or for UL data transmission. For example, a PDCCH may be transmitted in the DL control region and the PDSCH may be transmitted in the DL data region. A PUCCH may be transmitted in the UL control region, and a PUSCH may be transmitted in the UL data region.

If this structure of a subframe (or slot) is used, it may reduce time required to retransmit data regarding which a reception error occurred, and thus, a final data transmission waiting time may be minimized. In such structure of the self-contained subframe (slot), a time gap may be required for transition from a transmission mode to a reception mode or vice versa. To this end, when downlink is transitioned to uplink in the subframe structure, some OFDM symbols may be set as a Guard Period (GP).

<Support of Various Numerology>

In a next system, a plurality of numerologies may be provided to a terminal according to the development of wireless communication technology. For example, when SCS is 15 kHz, it supports a wide area in traditional cellular bands, and when SCS is 30 kHz/60 kHz, it supports a dense-urban, lower latency and wider carrier bandwidth, and when SCS is 60 kHz or higher, it supports a bandwidth greater than 24.25 GHz to overcome phase noise.

The numerology may be defined by a cycle prefix (CP) length and a subcarrier spacing (SCS). One cell may provide a plurality of numerologies to the terminal. When an index of numerology is expressed as µ, an interval of each subcarrier and a corresponding CP length may be as shown in the table below.

TABLE 3

| µ | $\Delta f = 2^\mu \cdot 15$ [kHz] | CP |
|---|---|---|
| 0 | 15 | normal |
| 1 | 30 | normal |
| 2 | 60 | normal, extended |
| 3 | 120 | normal |
| 4 | 240 | normal |

In the case of normal CP, when an index of numerology is expressed as µ, the number ($N_{symb}^{slot}$) of OFDM symbols per slot, the number of slots ($N_{slot}^{frame,\mu}$) per frame, and the number ($N_{slot}^{subframe,\mu}$) of slots per subframe are shown in the table below.

TABLE 4

| µ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In the case of extended CP, when the index of numerology is expressed as µ, the number ($N_{symb}^{slot}$) of OFDM symbols per slot, the number ($N_{slot}^{frame,\mu}$) of slots per frame, and the number ($N_{slot}^{subframe,\mu}$) of slots per subframe are shown in the table below.

TABLE 5

| µ | $N^{slot}_{symb}$ | $N^{frame,\mu}_{slot}$ | $N^{subframe,\mu}_{slot}$ |
|---|---|---|---|
| 2 | 12 | 40 | 4 |

Figure 8:
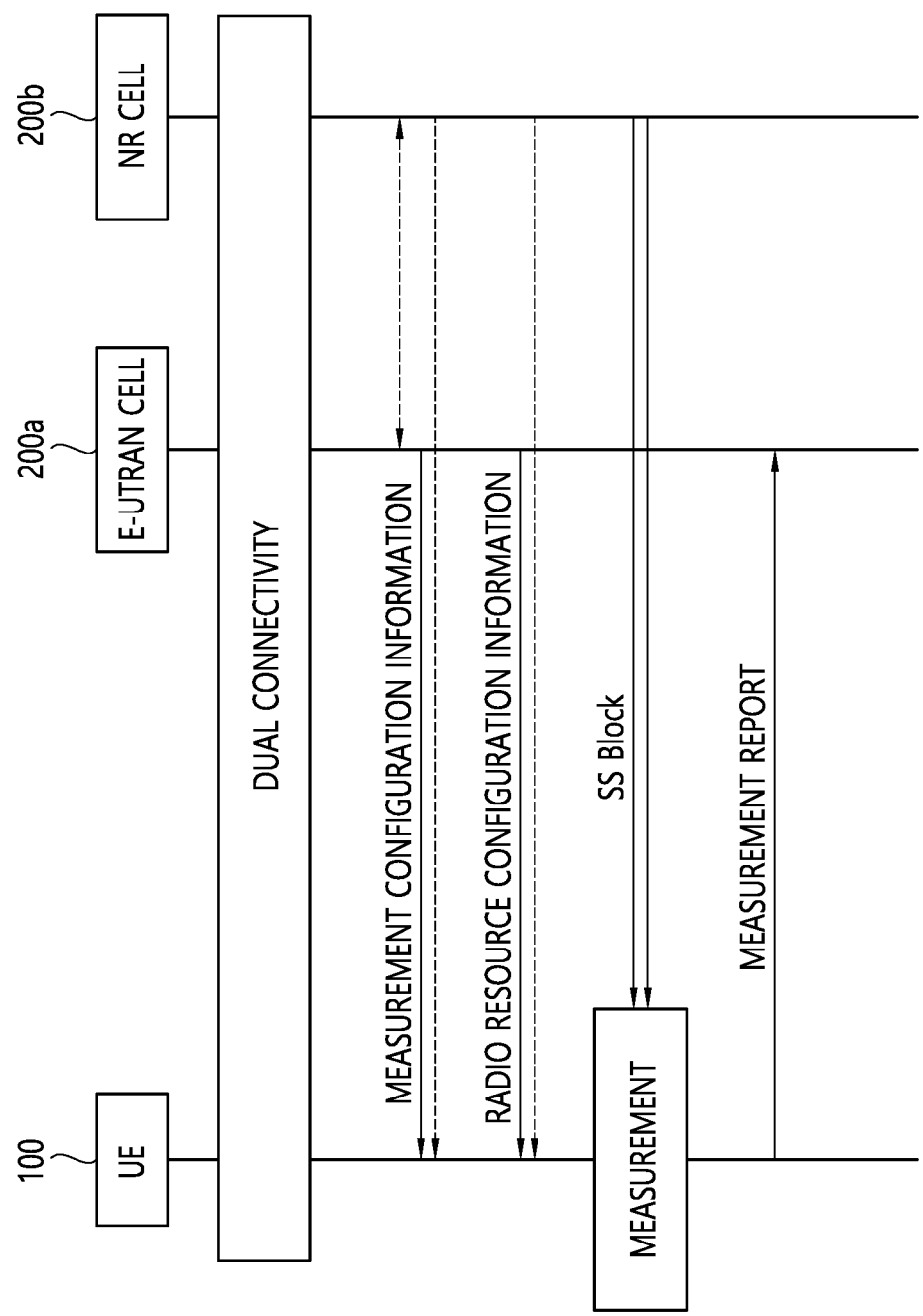
FIG. 8 shows an example of performing measurement in E-UTRAN and NR (EN) DC case.

FIG. 8 shows an example of performing measurement in E-UTRAN and NR (EN) DC case.

Referring to FIG. 8, the UE 100 are connected in EN-DC with an E-UTRAN (that is, LTE/LTE-A) cell. Here, a Pcell in EN-DC may be an E-UTRAN (that is, LTE/LTE-A) cell, and a PSCell in EN-DC may be an NR cell.

The UE 100 may receive measurement configuration (or "measconfig") information element (IE) of the E-UTRAN (that is, LTE/LTE-A) cell. The measurement configuration (or "measconfig") IE received from the E-UTRAN (that is, LTE/LTE-A) cell may further include fields shown in the following table, in addition to the fields shown in Table 6.

TABLE 6

| MeasConfig field description |
|---|
| fr1-Gap |
| This field exists when a UE is configured with EN-DC. This field indicates whether a gap is applied to perform measurement on FR1 band |
| mgta |
| It indicates whether to apply a timing advance (TA) of 0.5 ms for a measurement gap configuration provided by the E-UTRAN. |

The measurement configuration (or "measconfig") IE may further include a measGapConfig field for setting a measurement gap (MG), as shown in Table 7. A gapoffset field within the measGapConfig field may further include gp4, gp5, gp11 for EN-DC, in addition to the example shown in Table 8.

Meanwhile, the UE 100 may receive a measurement configuration ("measconfig") IE of an NR cell, which is a PSCell, directly from the NR cell or through the E-UTRAN cell which is a Pcell.

Meanwhile, the measurement configuration ("measconfig") IE of the NR cell may include fields as shown in the following table.

TABLE 7

| MeasConfig field description |
|---|
| measGapConfig |
| It indicates configuration or cancelation of a measurement gap |
| s-MeasureConfig |
| It indicates a threshold value for measurement of NR SpCell RSRP when a UE needs to perform measurement on a non-serving cell. |

The above measGapConfig may further include fields as shown in the following table.

TABLE 8

| MeasGapConfig field description |
|---|
| gapFR2 |
| It indicates a measurement gap configuration applicable for FR2 frequency range. |
| gapOffset |
| It indicates a gap offset of a gap pattern with an MGRP. |
| mgl |
| It indicates a measurement gap length by ms. There may be 3 ms, 4 ms, 6 ms, etc. |
| mgrp |
| It indicates a measurement gap repetition period by ms. |
| mgta |
| It indicates whether to apply a timing advance (TA) of 0.5 ms for a measurement gap configuration. |

Meanwhile, the UE 100 receives a radio resource configuration information element (IE) of the E-UTRAN (that is, LTE/LTE-A) cell which is a Pcell. In addition, the UE may receive a radio resource configuration IE of an NR cell, which is a PSCell, from the NR cell or through the E-UTRAN cell which is a Pcell. The radio resource configuration IE includes subframe pattern information.

The UE 100 performs measurement and reports a measurement result. Specifically, the UE 100 interrupts data transmission and reception with the E-UTRAN (that is, LTE/LTE-A) cell during the measurement gap, retunes its own RF chain, and performs measurement based on receipt of an SS block from an NR cell.

Figure 9:
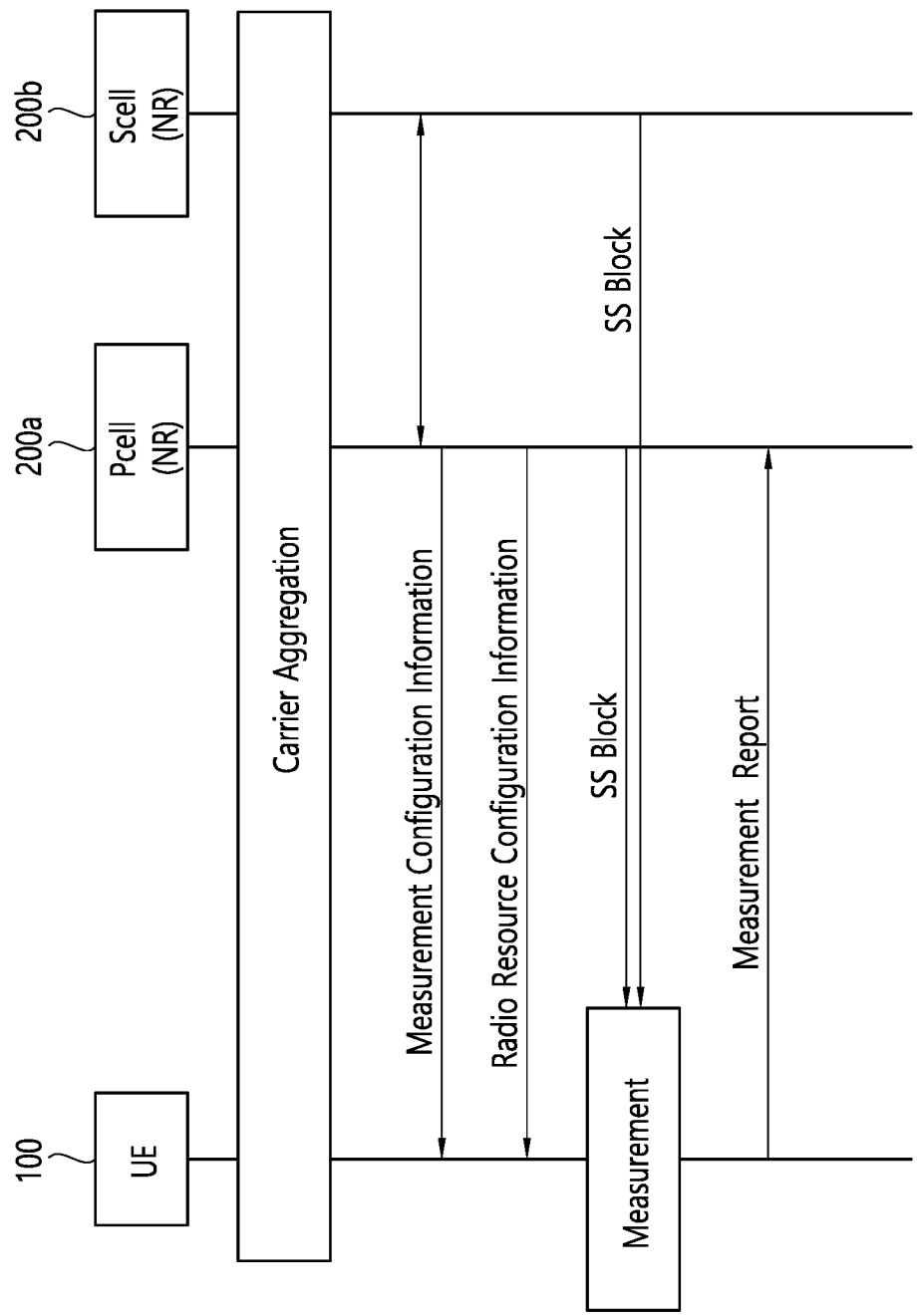
FIG. 9 shows an example of performing measurement in NR carrier aggregation case.

FIG. 9 shows an example of performing measurement in NR carrier aggregation case.

Referring to FIG. 9, the UE 100 is configured for a carrier aggregation with a first cell (e.g., Pcell) and a second cell (e.g. Scell). Here, the Pcell may be an NR based cell, and the Scell may be an NR based cell.

The UE 100 may receive measurement configuration (or "measconfig") information element (IE). The measurement configuration (or "measconfig") IE may include fields shown in the above tables.

The UE 100 receives a radio resource configuration information element (IE).

The UE 100 performs measurement and reports a measurement result.

<Cell Re-Selection>

The cell reselection procedure allows the UE to select a more suitable cell and camp on it.

When the UE is in either Camped Normally state or Camped on Any Cell state on a cell, the UE shall attempt to detect, synchronize, and monitor intra-frequency, inter-frequency and inter-RAT cells indicated by the serving cell. For intra-frequency and inter-frequency cells the serving cell may not provide explicit neighbor list but carrier frequency information and bandwidth information only. UE measurement activity is also controlled by measurement rules, allowing the UE to limit its measurement activity.

For idle mode cell re-selection purposes, the UE shall be capable of monitoring at least:

Intra-frequency carrier, and

Depending on UE capability, 7 NR inter-frequency carriers, and

Depending on UE capability, 7 FDD E-UTRA inter-RAT carriers, and

Depending on UE capability, 7 TDD E-UTRA inter-RAT carriers.

In addition to the requirements defined above, a UE supporting E-UTRA measurements in RRC IDLE state shall be capable of monitoring a total of at least 14 carrier frequency layers, which includes serving layer, comprising of any above defined combination of E-UTRA FDD, E-UTRA TDD and NR layers.

The UE shall measure the SS-RSRP and SS-RSRQ level of the serving cell and evaluate the cell selection criterion S for the serving cell at least once every M1*N1 DRX cycle.

The UE shall filter the SS-RSRP and SS-RSRQ measurements of the serving cell using at least 2 measurements. Within the set of measurements used for the filtering, at least two measurements shall be spaced by, at least DRX cycle/2.

If the UE has evaluated according to Table 9 in Nserv consecutive DRX cycles that the serving cell does not fulfil the cell selection criterion S, the UE shall initiate the measurements of all neighbor cells indicated by the serving cell, regardless of the measurement rules currently limiting UE measurement activities.

If the UE in RRC IDLE has not found any new suitable cell based on searches and measurements using the intra-frequency, inter-frequency and inter-RAT information indicated in the system information for 10 s, the UE shall initiate cell selection procedures for the selected PLMN.

The UE shall be able to identify new intra-frequency cells and perform SS-RSRP and SS-RSRQ measurements of the identified intra-frequency cells without an explicit intra-frequency neighbor list containing physical layer cell identities. The UE shall be able to evaluate whether a newly detectable intra-frequency cell meets the reselection criteria within $T_{detect,NR\_Intra}$ when that Treselection=0. An intra frequency cell is considered to be detectable according to the conditions for a corresponding Band.

The UE shall measure SS-RSRP and SS-RSRQ at least every $T_{measure,NR\_Intra}$ (see table 10) for intra-frequency cells that are identified and measured according to the measurement rules.

The UE shall filter SS-RSRP and SS-RSRQ measurements of each measured intra-frequency cell using at least 2 measurements. Within the set of measurements used for the filtering, at least two measurements shall be spaced by at least $T_{measure,NR\_Intra}/2$.

The UE shall not consider a NR neighbor cell in cell reselection, if it is indicated as not allowed in the measurement control system information of the serving cell.

For an intra-frequency cell that has been already detected, but that has not been reselected to, the filtering shall be such that the UE shall be capable of evaluating that the intra-frequency cell has met reselection criterion defined [1] within $T_{evaluate,NR\_Intra}$ when Treselection=0 as specified in table 10 provided that:

when rangeToBestCell is not configured:
  the cell is at least 3 dB better ranked in FR1 or 4.5 dB better ranked in FR2.

when rangeToBestCell is configured:
  the cell has the highest number of beams above the threshold absThreshSS-BlocksConsolidation among all detected cells whose cell-ranking criterion R value [1] is within rangeToBestCell of the cell-ranking criterion R value of the highest ranked cell.
  if there are multiple such cells, the cell has the highest rank among them.
  the cell is at least 3 dB better ranked in FR1 or [4.5] dB better ranked in FR2 if the current serving cell is among them.

When evaluating cells for reselection, the SSB side conditions apply to both serving and non-serving intra-frequency cells.

If Treselection timer has a non zero value and the intra-frequency cell is satisfied with the reselection criteria, UE shall evaluate this intra-frequency cell for the Treselection time. If this cell remains satisfied with the reselection criteria within this duration, then the UE shall reselect that cell.

TABLE 9

| DRX cycle length [s] | Scaling Factor (N1) FR1 | Scaling Factor (N1) FR2[Note1] | $N_{serv}$ [number of DRX cycles] |
|---|---|---|---|
| 0.32 | 1 | 8 | M1*N1*4 |
| 0.64 | | 5 | M1*N1*4 |
| 1.28 | | 4 | N1*2 |
| 2.56 | | 3 | N1*2 |

Note 1: Applies for UE supporting power class 2&3&4. For UE supporting power class 1, N1 = 8 for all DRX cycle length.

TABLE 10

| DRX cycle length [s] | Scaling Factor (N1) FR1 | Scaling Factor (N1) FR2[Note1] | $T_{detect,NR\_Intra}$ [s] (number of DRX cycles) | $T_{measure,NR\_Intra}$ [s] (number of DRX cycles) | $T_{evaluate,NR\_Intra}$ [s] (number of DRX cycles) |
|---|---|---|---|---|---|
| 0.32 | 1 | 8 | 11.52 × N1 × M2 (36 × N1 × M2) | 1.28 × N1 × M2 (4 × N1 × M2) | 5.12 × N1 × M2 (16 × N1 × M2) |
| 0.64 | | 5 | 17.92 × N1 (28 × N1) | 1.28 × N1 (2 × N1) | 5.12 × N1 (8 × N1) |
| 1.28 | | 4 | 32 × N1 (25 × N1) | 1.28 × N1 (1 × N1) | 6.4 × N1 (5 × N1) |

TABLE 10-continued

| DRX cycle length [s] | Scaling Factor (N1) FR1 | FR2Note1 | $T_{detect,NR\_Intra}$ [s] (number of DRX cycles) | $T_{measure,NR\_Intra}$ [s] (number of DRX cycles) | $T_{evaluate, NR\_Intra}$ [s] (number of DRX cycles) |
|---|---|---|---|---|---|
| 2.56 | | 3 | 58.88 × N1 (23 × N1) | 2.56 × N1 (1 × N1) | 7.68 × N1 (3 × N1) |

Note 1: Applies for UE supporting power class 2&3&4. For UE supporting power class 1, N1 = 8 for all DRX cycle length.
Note 2: M2 = 1.5 if SMTC periodicity of measured intra-frequency cell >20 ms; otherwise M2 = 1.

The UE shall be able to identify new inter-frequency cells and perform SS-RSRP or SS-RSRQ measurements of identified inter-frequency cells if carrier frequency information is provided by the serving cell, even if no explicit neighbor list with physical layer cell identities is provided. If Srxlev>$S_{nonIntraSearchP}$ and Squal>$S_{nonIntraSearchQ}$ then the UE shall search for inter-frequency layers of higher priority at least every Thigher_priority_search.

If Srxlev≤$S_{nonIntraSearchP}$ or Squal≤$S_{nonIntraSearchQ}$ then the UE shall search for and measure inter-frequency layers of higher, equal or lower priority in preparation for possible reselection. In this scenario, the minimum rate at which the UE is required to search for and measure higher priority layers shall be the same as that defined below in this clause.

The UE shall be able to evaluate whether a newly detectable inter-frequency cell meets the reselection criteria defined in TS38.304 within Kcarrier*$T_{detect,NR\_Inter}$ if at least carrier frequency information is provided for inter-frequency neighbor cells by the serving cells when Treselection=0 provided that the reselection criteria is met by a margin of at least 5 dB in FR1 or 6.5 dB in FR2 for reselections based on ranking or 6 dB in FR1 or 7.5 dB in FR2 for SS-RSRP reselections based on absolute priorities or 4 dB in FR1 and 4 dB in FR2 for SS-RSRQ reselections based on absolute priorities. The parameter Kcarrier is the number of NR inter-frequency carriers indicated by the serving cell. An inter-frequency cell is considered to be detectable according to the conditions for a corresponding Band.

When higher priority cells are found by the higher priority search, they shall be measured at least every $T_{measure,NR\_Inter}$. If, after detecting a cell in a higher priority search, it is determined that reselection has not occurred then the UE is not required to continuously measure the detected cell to evaluate the ongoing possibility of reselection. However, the minimum measurement filtering requirements specified later in this clause shall still be met by the UE before it makes any determination that it may stop measuring the cell. If the UE detects on a NR carrier a cell whose physical identity is indicated as not allowed for that carrier in the measurement control system information of the serving cell, the UE is not required to perform measurements on that cell.

The UE shall measure SS-RSRP or SS-RSRQ at least every Kcarrier*$T_{measure,NR\_Inter}$ (see table 11) for identified lower or equal priority inter-frequency cells. If the UE detects on a NR carrier a cell whose physical identity is indicated as not allowed for that carrier in the measurement control system information of the serving cell, the UE is not required to perform measurements on that cell.

The UE shall filter SS-RSRP or SS-RSRQ measurements of each measured higher, lower and equal priority inter-frequency cell using at least 2 measurements. Within the set of measurements used for the filtering, at least two measurements shall be spaced by at least $T_{measure,NR\_Inter}$/2.

The UE shall not consider a NR neighbor cell in cell reselection, if it is indicated as not allowed in the measurement control system information of the serving cell.

For an inter-frequency cell that has been already detected, but that has not been reselected to, the filtering shall be such that the UE shall be capable of evaluating that the inter-frequency cell has met reselection criterion defined TS 38.304 within Kcarrier*$T_{evaluate,NR\_Inter}$ when Treselection=0 as specified in table 4.2.2.4-1 provided that the reselection criteria is met by
- the condition when performing equal priority reselection and
- when rangeToBestCell is not configured:
  - the cell is at least 5 dB better ranked in FR1 or 6.5 dB better ranked in FR2 or.
- when rangeToBestCell is configured:
  - the cell has the highest number of beams above the threshold absThreshSS-BlocksConsolidation among all detected cells whose cell-ranking criterion R value [1] is within rangeToBestCell of the cell-ranking criterion R value of the highest ranked cell.
  - if there are multiple such cells, the cell has the highest rank among them
  - the cell is at least 5 dB better ranked in FR1 or [6.5] dB better ranked in FR2 if the current serving cell is among them. or
- 6 dB in FR1 or 7.5 dB in FR2 for SS-RSRP reselections based on absolute priorities or
- 4 dB in FR1 or 4 dB in FR2 for SS-RSRQ reselections based on absolute priorities.

When evaluating cells for reselection, the SSB side conditions apply to both serving and inter-frequency cells.

If Treselection timer has a non zero value and the inter-frequency cell is satisfied with the reselection criteria, the UE shall evaluate this inter-frequency cell for the Treselection time. If this cell remains satisfied with the reselection criteria within this duration, then the UE shall reselect that cell.

The UE is not expected to meet the measurement requirements for an inter-frequency carrier under DRX cycle=320 ms defined in Table 4.2.2.4-1 under the following conditions:
- TSMTC_intra=TSMTC_inter=160 ms; where TSMTC_intra and TSMTC_inter are periodicities of the SMTC occasions configured for the intra-frequency carrier and the inter-frequency carrier respectively, and
- SMTC occasions configured for the inter-frequency carrier occur up to 1 ms before the start or up to 1 ms after the end of the SMTC occasions configured for the intra-frequency carrier, and
- SMTC occasions configured for the intra-frequency carrier and for the inter-frequency carrier occur up to 1 ms before the start or up to 1 ms after the end of the paging occasion [1].

TABLE 11

| DRX cycle length [s] | Scaling Factor (N1) FR1 | FR2Note1 | $T_{detect,NR\_Inter}$ [s] (number of DRX cycles) | $T_{measure, NR\_Inter}$ [s] (number of DRX cycles) | $T_{evaluate, NR\_Inter}$ [s] (number of DRX cycles) |
|---|---|---|---|---|---|
| 0.32 | 1 | 8 | 11.52 × N1 × 1.5 (36 × N1 × 1.5) | 1.28 × N1 × 1.5 (4 × N1 × 1.5) | 5.12 × N1 × 1.5 (16 × N1 × 1.5) |

TABLE 11-continued

| DRX cycle length [s] | Scaling Factor (N1) | | $T_{detect,NR\_Inter}$ [s] (number of DRX cycles) | $T_{measure, NR\_Inter}$ [s] (number of DRX cycles) | $T_{evaluate, NR\_Inter}$ [s] (number of DRX cycles) |
|---|---|---|---|---|---|
| | FR1 | FR2Note1 | | | |
| 0.64 | | 5 | 17.92 × N1 (28 × N1) | 1.28 × N1 (2 × N1) | 5.12 × N1 (8 × N1) |
| 1.28 | | 4 | 32 × N1 (25 × N1) | 1.28 × N1 (1 × N1) | 6.4 × N1 (5 × N1) |
| 2.56 | | 3 | 58.88 × N1 (23 × N1) | 2.56 × N1 (1 × N1) | 7.68 × N1 (3 × N1) |

Note 1: Applies for UE supporting power class 2&3&4. For UE supporting power class 1, N1 = 8 for all DRX cycle length.

Based on serving cell signal quality, UE may measure neighbor cell for cell selection or reselection. If the serving cell fulfils Srxlev>$S_{IntraSearchP}$ and Squal>$S_{IntraSearchQ}$, the UE may choose not to perform intra-frequency measurements. Otherwise, the UE may perform intra-frequency measurements.

$S_{rxlev}$ is cell selection RX level value (dB). Squal is cell selection quality value (dB). $S_{IntraSearchP}$ specifies the $S_{rxlev}$ threshold (in dB) for intra-frequency measurements. $S_{IntraSearchQ}$ specifies the Squal threshold (in dB) for intra-frequency measurements <Measurement Gap>

UEs shall support the measurement gap patterns listed in Table 12 based on the applicability specified in table 13 and 14. UE determines measurement gap timing based on gap offset configuration and measurement gap timing advance configuration provided by higher layer signaling.

Table 12 shows Gap Pattern Configurations.

TABLE 12

| Gap Pattern Id | Measurement Gap Length (MGL, ms) | Measurement Gap Repetition Period (MGRP, ms) |
|---|---|---|
| 0 | 6 | 40 |
| 1 | 6 | 80 |
| 2 | 3 | 40 |
| 3 | 3 | 80 |
| 4 | 6 | 20 |
| 5 | 6 | 160 |
| 6 | 4 | 20 |
| 7 | 4 | 40 |
| 8 | 4 | 80 |
| 9 | 4 | 160 |
| 10 | 3 | 20 |
| 11 | 3 | 160 |
| 12 | 5.5 | 20 |
| 13 | 5.5 | 40 |
| 14 | 5.5 | 80 |
| 15 | 5.5 | 160 |
| 16 | 3.5 | 20 |
| 17 | 3.5 | 40 |
| 18 | 3.5 | 80 |
| 19 | 3.5 | 160 |
| 20 | 1.5 | 20 |
| 21 | 1.5 | 40 |
| 22 | 1.5 | 80 |
| 23 | 1.5 | 160 |

Table 13 shows Applicability for Gap Pattern Configurations supported by the E-UTRA-NR dual connectivity UE.

TABLE 13

| Measurement gap pattern configuration | Serving cell | Measurement Purpose | Applicable Gap Pattern ID |
|---|---|---|---|
| Per-UE measurement gap | E-UTRA + FR1, or | non-NR RAT[Note1,2] | 0,1,2,3 0-11 |
| | E-UTRA + FR2, or | FR1 and/or FR2 | 0,1,2,3 |
| | E-UTRA + FR1 + FR2 | non-NR RAT[Note1,2] and FR1 and/or FR2 | |
| Per FR measurement gap | E-UTRA and, FR1 if configured | non-NR RAT[Note1,2] | 0,1,2,3 |
| | FR2 if configured | | No gap |
| | E-UTRA and, FR1 if configured | FR1 only | 0-11 |
| | FR2 if configured | | No gap |
| | E-UTRA and, FR1 if configured | FR2 only | No gap |
| | FR2 if configured | | 12-23 |
| | E-UTRA and, FR1 if configured | non-NR RAT[Note1,2] and FR1 | 0,1,2,3 |
| | FR2 if configured | | No gap |
| | E-UTRA and, FR1 if configured | FR1 and FR2 | 0-11 |
| | FR2 if configured | | 12-23 |
| | E-UTRA and, FR1 if configured | non-NR RAT[Note1,2] and FR2 | 0,1,2,3 |
| | FR2 if configured | | 12-23 |
| | E-UTRA and, FR1 if configured | non-NR RAT[Note1,2] and FR1 and FR2 | 0,1,2,3 |
| | FR2 if configured | | 12-23 |

Note: if GSM or UTRA TDD or UTRA FDD inter-RAT frequency layer is configured to be monitered, only measurement gap pattern #0 and #1 can be used for per-FR gap in E-UTRA and FR1 if configured, or for per-UE gap.
NOTE 1Non-NR RAT includes E-UTRA, UTRA and/or GSM.
NOTE 2The gap pattern 2 and 3 are supported by UEs which support shortMeasurementGap-r14.
NOTE 3: When E-UTRA inter-frequency RSTD measurements are configured and the UE requires measurement gaps for performing such measurements, only Gap Pattern #0 can be used.

For E-UTRA-NR dual connectivity, when serving cells are on E-UTRA and FR1, measurement objects are in both E-UTRA/FR1 and FR2,
    If MN indicates UE that the measurement gap from MN applies to E-UTRA/FR1/FR2 serving cells, UE fulfils the per-UE measurement requirements for both E-UTRA/FR1 and FR2 measurement objects based on the measurement gap pattern configured by MN;
    If MN indicates UE that the measurement gap from MN applies to only LTE/FR1 serving cell(s),
    UE fulfils the measurement requirements for FR1/LTE measurement objects based on the configured measurement gap pattern;
    UE fulfils the requirements for FR2 measurement objects based on effective MGRP=20 ms;
When serving cells are in E-UTRA, FR1 and FR2, Measurement objects are in both E-UTRA/FR1 and FR2,
    If MN indicates UE that the measurement gap from MN applies to E-UTRA/FR1/FR2 serving cells, UE fulfils the per-UE measurement requirements for both E-UTRA/FR1 and FR2 measurement objects based on the measurement gap pattern configured by MN.

Table 14 shows Applicability for Gap Pattern Configurations supported by the UE with NR standalone operation.

TABLE 14

| Measurement gap pattern configuration | Serving cell | Measurement Purpose NOTE 2 | Applicable Gap Pattern Id |
|---|---|---|---|
| Per-UE measurement gap | FR1, or FR1 + FR2 | E-UTRA only | 0,1,2,3 |
| | | FR1 and/or FR2 | 0-11 |
| | | E-UTRAN and FR1 and/or FR2 | 0,1,2,3 |
| | FR2 | E-UTRA only | 0,1,2,3 |
| | | FR1 only | 0-11 |
| | | FR1 and FR2 | 0-11 |
| | | E-UTRAN and FR1 and/or FR2 | 0,1,2,3 |
| | | FR2 only | 12-23 |
| Per FR measurement gap | FR1 if configured | E-UTRA only | 0,1,2,3 |
| | FR2 if configured | | No gap |
| | FR1 if configured | FR1 only | 0-11 |
| | FR2 if configured | | No gap |
| | FR1 if configured | FR2 only | No gap |
| | FR2 if configured | | 12-23 |
| | FR1 if configured | E-UTRA and FR1 | 0,1,2,3 |
| | FR2 if configured | | No gap |
| | FR1 if configured | FR1 and FR2 | 0-11 |
| | FR2 if configured | | 12-23 |
| | FR1 if configured | E-UTRA and FR2 | 0,1,2,3 |
| | FR2 if configured | | 12-23 |
| | FR1 if configured | E-UTRA and FR1 and FR2 | 0,1,2,3 |
| | FR2 if configured | | 12-23 |

NOTE 1: When E-UTRA inter-RAT RSTD measurements are configured and the UE requires measurement gaps for performing such measurements, only Gap Pattern #0 can be used.
NOTE 2: Measurement purpose which includes E-UTRA measurements includes also inter-RAT E-UTRA RSRP and RSRQ measurements for E-CID <Non-Terrestrial Networks>

A non-terrestrial network refers to a network, or segment of networks using RF resources on board a satellite (or UAS platform).

The typical scenario of a non-terrestrial network providing access to user equipment is depicted below.

Figure 10:
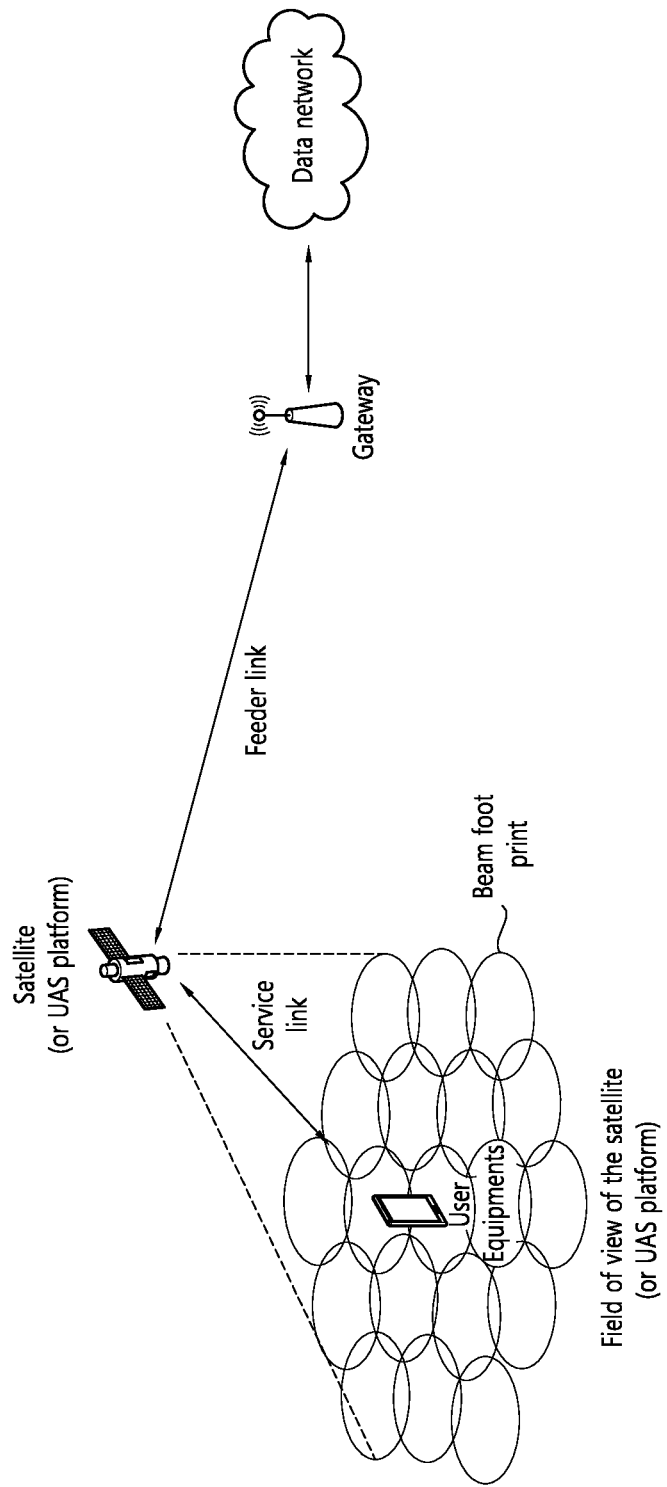
FIG. 10 shows Non-terrestrial network typical scenario based on transparent payload.

FIG. 10 shows Non-terrestrial network typical scenario based on transparent payload.

Figure 11:
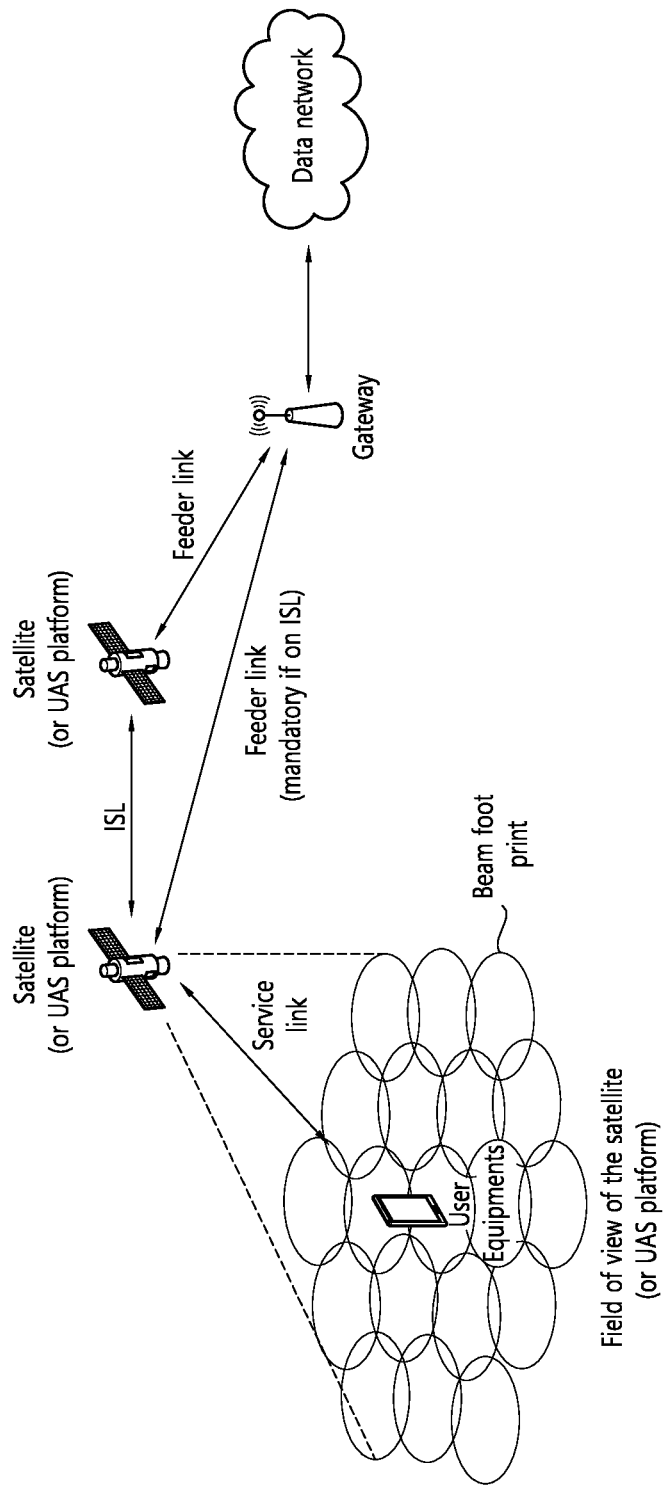
FIG. 11 shows Non-terrestrial network typical scenario based on regenerative payload.

FIG. 11 shows Non-terrestrial network typical scenario based on regenerative payload.

Non-Terrestrial Network typically features the following elements:

One or several sat-gateways that connect the Non-Terrestrial Network to a public data network A GEO satellite is fed by one or several sat-gateways which are deployed across the satellite targeted coverage (e.g. regional or even continental coverage). We assume that UE in a cell are served by only one sat-gateway A Non-GEO satellite served successively by one or several sat-gateways at a time. The system ensures service and feeder link continuity between the successive serving sat-gateways with sufficient time duration to proceed with mobility anchoring and hand-over A Feeder link or radio link between a sat-gateway and the satellite (or UAS platform)

A service link or radio link between the user equipment and the satellite (or UAS platform).

A satellite (or UAS platform) which may implement either a transparent or a regenerative (with on board processing) payload. The satellite (or UAS platform) generate beams typically generate several beams over a given service area bounded by its field of view. The footprints of the beams are typically of elliptic shape. The field of view of a satellites (or UAS platforms) depends on the on board antenna diagram and min elevation angle.

A transparent payload: Radio Frequency filtering, Frequency conversion and amplification. Hence, the waveform signal repeated by the payload is un-changed;

A regenerative payload: Radio Frequency filtering, Frequency conversion and amplification as well as demodulation/decoding, switch and/or routing, coding/modulation. This is effectively equivalent to having all or part of base station functions (e.g. gNB) on board the satellite (or UAS platform).

Inter-satellite links (ISL) optionally in case of a constellation of satellites. This will require regenerative payloads on board the satellites. ISL may operate in RF frequency or optical bands.

User Equipment are served by the satellite (or UAS platform) within the targeted service area.

There may be different types of satellites (or UAS platforms) listed here under:

Table 15 shows Types of NTN platforms.

TABLE 15

| Platforms | Altitude range | Orbit | Typical beam footprint size |
|---|---|---|---|
| Low-Earth Orbit (LEO) satellite | 300-1500 km | Circular around the earth | 100-1000 km |
| Medium-Earth Orbit (MEO) satellite | 7000-25000 km | | 100-1000 km |
| Geostationary Earth Orbit (GEO) satellite | 35 786 km | notional station keeping position fixed in terms | 200-3500 km |
| UAS platform (including HAPS) | 8-50 km (20 km for HAPS) | of elevation/azimuth with respect to a given earth point | 5-200 km |
| High Elliptical Orbit (HEO) satellite | 400-50000 km | Elliptical around the earth | 200-3500 km |

GEO satellite and UAS are used to provide continental, regional or local service. A constellation of LEO and MEO is used to provide services in both Northern and Southern hemispheres. In some case, the constellation can even provide global coverage including polar regions. For the later, this requires appropriate orbit inclination, sufficient beams generated and inter-satellite links.

<Problems to be Solved in the Disclosure of this Specification>

NR-based NTN (non-terrestrial network) communication is a method for efficiently providing communication services to regions, where terrestrial network services are not provided, through satellites (geostationary orbiting satellites GEO, low-orbit satellite LEO, etc.). In the case of transparent satellite, the satellite amplifies the signal transmitted from the terrestrial base station (gNB-NTN gateway) and transmits the signal to the UE. In the case of regenerative satellite, in addition to signal amplification, the satellite performs the functions of a terrestrial base station such as routing, coding and modulation, and decoding and demodulation. An NTN terminal has a GPS function and periodically receives location, time, and speed information for NTN satellites.

Figure 12A:
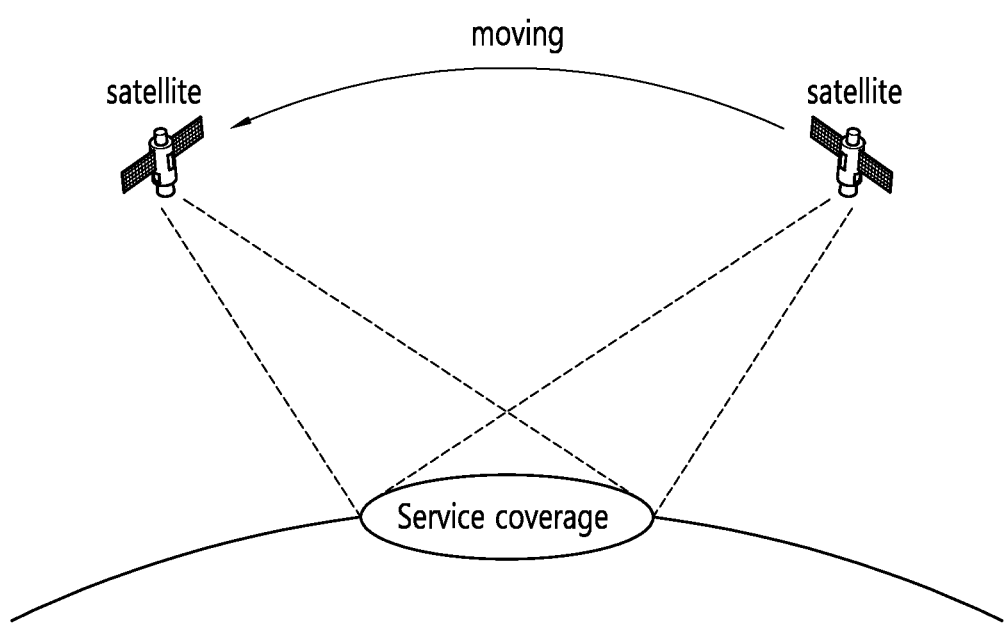
FIG. 12a and FIG. 12b show Service coverage for NGSO satellite according to earth fixed beam and earth moving beam.
Figure 12B:
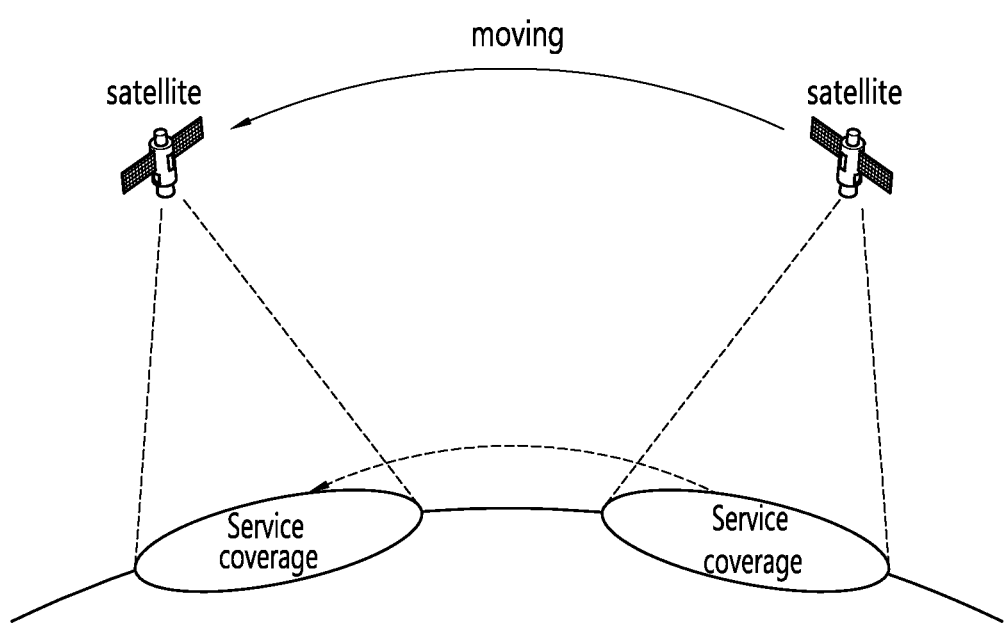

FIG. 12a and FIG. 12b show Service coverage for NGSO satellite according to earth fixed beam and earth moving beam.

In the case of a non-geostationary (NGSO) satellite, it moves in a fixed orbit, establishes a link with a TN base station (NTN gateway) and an NTN UE, and considers two types of service coverage, an earth fixed beam and an earth moving beam. FIG. 12a shows a service coverage for NGSO satellite based on earth fixed beam. FIG. 12b shows a service coverage for NGSO satellite based on earth moving beam. Earth fixed beam maintains fixed service coverage for a certain period of time even if the LEO satellite moves to a certain orbit, and the earth moving beam also moves service coverage when the LEO satellite moves to a certain orbit.

Figure 13:
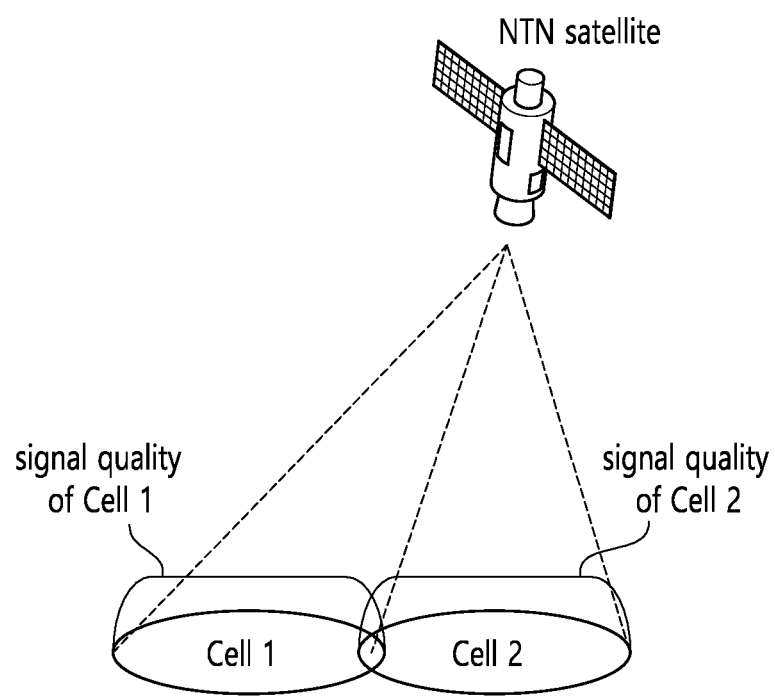
FIG. 13 shows example of signal quality of cells for NTN system.

FIG. 13 shows example of signal quality of cells for NTN system.

The basic NR terminal consider the signal quality of the cell when performing cell selection/reselection in IDLE or INACTIVE state or performing HO (handover) in CONNECTED state. However, in the NTN environment, the signal quality in each cell is almost constant in the service coverage, but rapidly decreases at the edge of the cell service coverage. Therefore, cell selection/reselection only based on signal quality may not be efficient in the NTN environment. In the present specification, disclosure will be described based on the IDLE/INACTIVE state, but may be equally applied to the CONNECTED state.

<Disclosure of the Present Specification>

1. Cell Service Time

Service time for specific cell may be provided by NTN satellite. For example, in the case of an earth fixed beam, there may be a time for maintaining a specific service coverage due to moving of the NTN satellite. Time information (e.g., service time) may indicate service start time and end time based on UTC time or timer. The time information may be provided to UE. When the UE is in the IDLE or INACTIVE state, the network may broadcast service time information to all UEs. Therefore, when the UE determines the start time of neighbor cell measurement, the UE may consider service time in addition to the current serving cell signal quality. Service time may be based on UTC time.

If the NTN satellite informs the service time for each cell to the UE, the UE may start measuring the neighbor cell X time before the end of the service time of the serving cell. The NTN satellite may be related to serving cell of the UE. That is, from the point at which the remaining service time (RST) of the serving cell reaches a certain time, the UE may start measuring the neighbor cell. This measurement may be independently performed regardless of whether the signal quality of the serving cell satisfies the cell selection criterion S. The remaining service time may be the difference time to stop serving the area and current time.

X may be threshold time for RST of serving cell. When RST of serving cell is less than X, UE may perform cell measurement.

Y may be threshold time for RST of neighbor cell. When RST of neighbor cell is less than Y, UE may not perform cell measurement.

When RST of the serving cell is less than X, the NTN UE may consider the neighbor cell's RST in order to exclude unnecessary neighbor cell measurement when performing measurement on the neighbor cell. If RST of the neighbor cell is less than Y, the NTN UE may not perform measurement on the neighbor cell. X and Y may be indicated from the network. That is, when performing measurement of the neighbor cell, NTN UE may consider i) whether RST of serving cell is less than X or not and ii) whether RST of neighbor cell is less than Y or not. Serving cell may indicate X and Y to the UE. Serving cell may indicate cell service time to the UE. The UE may calculate RST based on the cell service time. X and Y may be pre-configured in UE.

If the remaining service time is less than X seconds, the UE may initiate the measurements of all neighbor cells indicated by the serving cell. The neighbor cells with remaining service time of Y seconds may be excluded from intra-frequency or inter-frequency measurements. The remaining service time may be the difference time to stop serving the area and current time.

Figure 14:
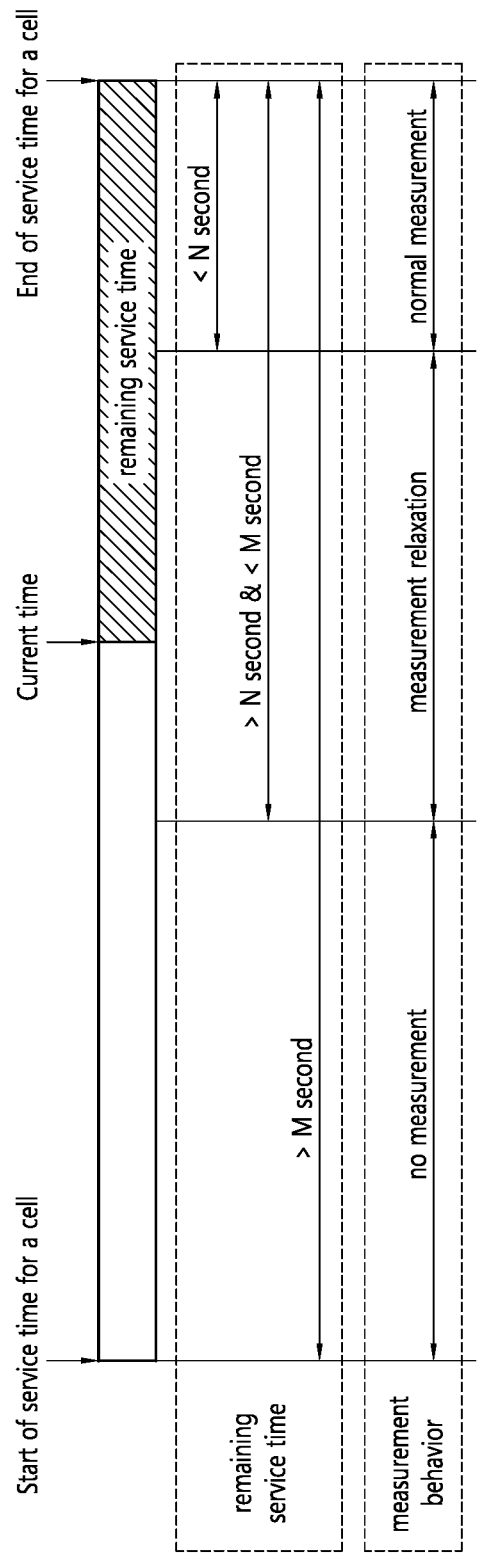
FIG. 14 shows example of measurement relaxation depending on remaining service time of serving cell according to an embodiment of the present specification.

FIG. 14 shows example of measurement relaxation depending on remaining service time of serving cell according to an embodiment of the present specification.

The NTN UE may perform measurement relaxation on the neighbor cell to save UE power based on RST of the serving cell. Based on the RST of the serving cell, the UE may perform measurement of neighbor cell in three sections (no measurement, measurement relaxation, and normal measurement). When RST is less than N second, normal measurement may be performed by the UE. When RST is between N second and M second, measurement relaxation may be applied to measure neighbor cells. Measurement relaxation may be performed by increasing the measurement period by k times (e.g., k=2, 3, 4 . . . ) compared to normal measurement. If RST is greater than M second, measurement of neighbor cell may be stopped. N and M may be indicated from the network to the UE.

Similarly, measurement relaxation may be considered based on the RST of a neighbor cell to be measured. That is, when the RST of the neighbor cell is greater than M1 second, normal measurement may be performed to increase the chance of cell reselection. When the RST of the neighbor cell is between N1 second and M1 second, measurement relaxation (e.g., increase the measurement period) may be applied to measure neighbor cell. When the RST of the neighbor cell is smaller than N1 second, no measurement may be performed to exclude neighbor cell from the target of cell reselection (to avoid frequent cell reselection). N1 and M1 may be indicated from the network.

2. Cell Reference Location

The NTN satellite may inform a reference location for a specific cell to NTN UE, and the NTN UE may derive a distance from the reference location of the cell based on the reference location. When the UE is in the IDLE or INACTIVE state, the network may broadcast or dedicate the reference location information to all UEs. The network may be serving cell. Therefore, the UE may derive the location of the UE in the serving cell based on the reference location.

Based on the location of the UE, the UE may consider the start time of the neighbor cell measurement.

If the NTN satellite informs the UE of the reference location for each cell and the specific distance X meter for serving cell, the UE may start measuring the neighbor cell from the time when the distance between the reference location of the serving cell and the UE becomes more than X meter.

This measurement based on location of the UE may be performed independently regardless of whether the signal quality of the serving cell satisfies the cell selection criterion S. In the past, UE may perform measurement for cell reselection based on signal quality of serving cell.

Serving cell may transmit X meter for serving cell and Y meter for neighbor cell to the UE.

The UE may measure the distance from the reference location of serving cell and may compare the distance with X meter.

When UE performs measurement on the neighbor cell based on the distance from the reference location of serving cell being more than X meter, the UE may measure distance from the reference location of the neighbor cell. Then the UE compare the distance from the reference location of the neighbor cell with Y meter. If the distance from the reference location of the neighbor cell becomes more than Y meter, the UE may exclude cell measurement of the neighbor cell. That is, the UE may not perform measurement of the neighbor cell.

The NTN UE may measure the distance from the reference location of the neighbor cell to exclude unnecessary neighbor cell measurement.

X and Y may be indicated from the network, and the X meter and Y meter may be meaning to indicate the start of each cell boundary.

If the distance between UE and the reference location of serving cell is larger than X meter, the UE may initiate the measurements of all neighbor cells indicated by the serving cell. A neighbor cell that the distance between UE and the reference location of a neighbor cell is larger than Y meter may be excluded from intra-frequency or inter-frequency measurements.

Figure 15:
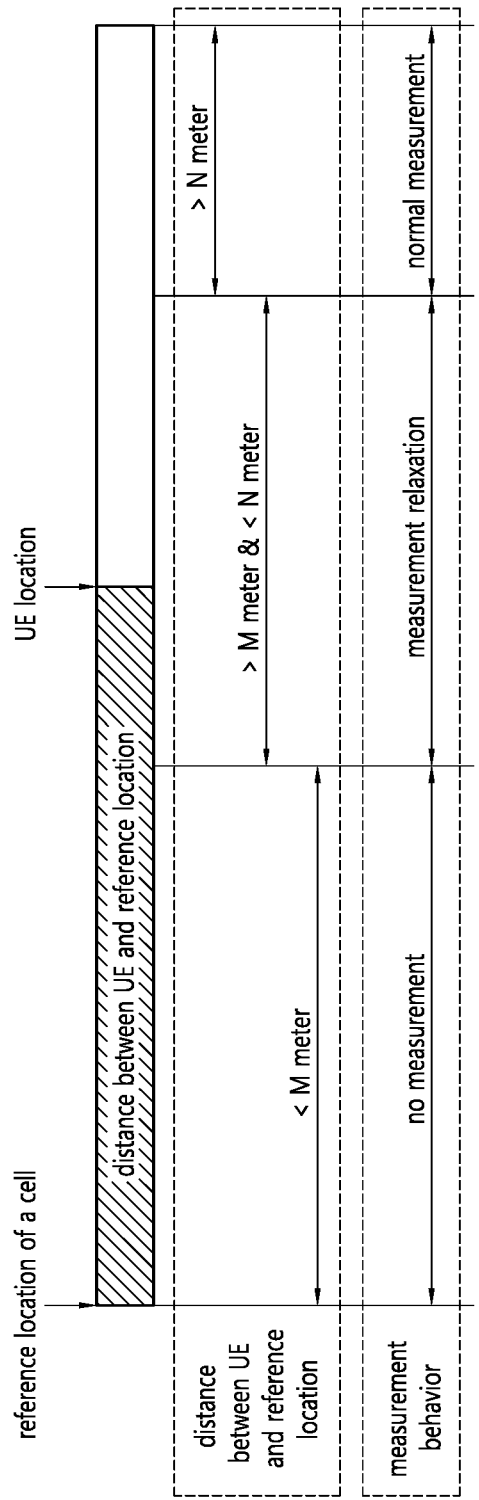
FIG. 15 shows example of measurement relaxation depending on distance between UE and reference location of serving cell according to an embodiment of the present specification.

FIG. 15 shows example of measurement relaxation depending on distance between UE and reference location of serving cell according to an embodiment of the present specification.

The NTN UE may perform measurement relaxation on the neighbor cell to save UE power based on the distance from the reference location of the serving cell. For example, based on the distance from the reference location of the serving cell, the UE may perform measurement of neighbor cell in three sections (no measurement, measurement relaxation, and normal measurement). When the distance from the reference location of serving cell is greater than N meter, normal measurement may be performed by the UE. When the distance from the reference location is between M meter and N meter, measurement relaxation may be applied to measure neighbor cells. Measurement relaxation may be performed by increasing the measurement period by k times (e.g., k=2, 3, 4 . . . ) compared to normal measurement. If the distance from the reference location of serving cell is less than M meter, the measurement of the neighbor cell may be stopped. N and M may be indicated from the network.

Similarly, measurement relaxation may be considered based on the distance between the reference location of the neighbor cell for measurement and UE. When the distance between the reference location of the neighbor cell and UE is less than M1 meter, normal measurement is performed to increase the chance of cell reselection. When the distance between the reference location of the neighbor cell and the UE is between M1 meter and N1 meter, measurement relaxation (e.g., increase the measurement period) may be applied to measure neighbor cell. When the distance between the reference location of the neighbor cell and the UE is greater than N1 meter, no measurement may be performed to exclude from the target of cell reselection (to avoid frequent cell reselection). N1 and M1 may be indicated from the network.

Measurement of a neighbor cell may be performed based on condition, which is combination of conditions such as cell service time, cell reference location, and signal quality described above.

For example, the cell service time and cell reference location may be configured by the network. If i) the signal quality is above a certain level, ii) the no measurement condition based on cell service time is satisfied and iii) the no measurement condition based on cell reference location is satisfied, the UE may skip measurement of neighbor cell. If at least one of i) signal quality, ii) cell service time and iii) cell reference location is satisfied with normal measurement condition, the UE may operate normally (that is, normal measurement) rather than no measurement or measurement relaxation.

If no measurement conditions are satisfied, power saving of UE in connected may be considered. In this case, if MG (measurement gap) for inter-frequency and inter-RAT measurement is configured to the UE, the UE may transmit information that MG is not needed to the network. Then the network may perform scheduling for data signal transmission/reception at the time when MG is configured. In addition, when normal measurement or measurement relaxation starts, the UE may request the network to configure the MG and may perform measurement on the neighbor cell based on the MG.

Plural of signal qualities of cells may be similar with each other when UE performs cell selection. In this case, priority of the cells may be configured based on cell service time and cell reference location. For example, if i) cell service time and cell reference location is configured, ii) RST is more than specific time and iii) the distance from reference location of a first cell is smaller than the distance from reference location of a second cell, priority of the first cell is higher than priority of the second cell. The UE may perform cell selection based on the described priority.

Figure 16:
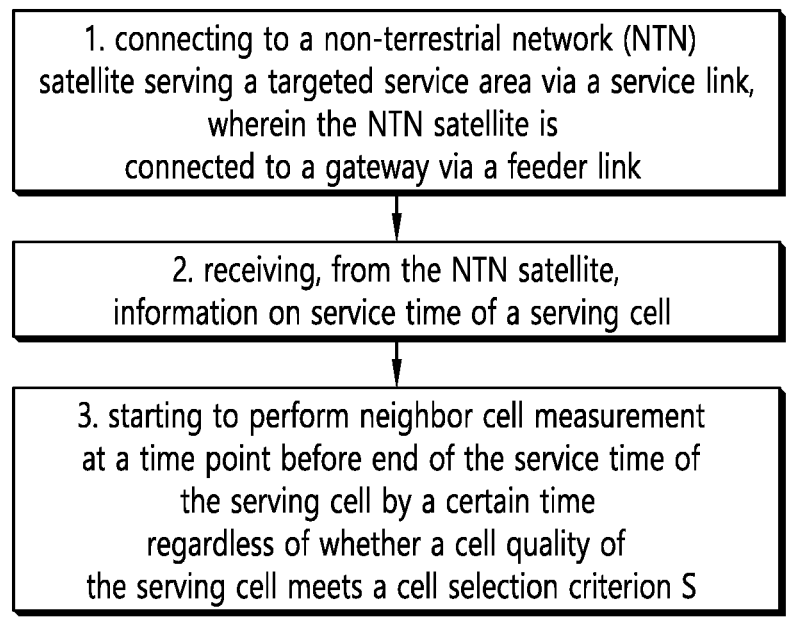
FIG. 16 shows examples of procedure for neighbor cell measurement according to an embodiment of the present specification.

FIG. 16 shows a procedure of UE according to the disclosure of the present specification.

The UE may connect to a non-terrestrial network (NTN) satellite serving a targeted service area via a service link, wherein the NTN satellite is connected to a gateway via a feeder link;

The UE may receive, from the NTN satellite, information on service time of a serving cell;

The UE may start to perform neighbor cell measurement at a time point before end of the service time of the serving cell by a certain time, regardless of whether a cell quality of the serving cell meets a cell selection criterion S, The NTN satellite may provide an earth fixed system.

The information on the service time may include information on when the serving cell is going to stop serving the targeted service area.

The information on the service time may be provided based on a Coordinated Universal Time (UTC).

The UE may skip perform neighbor cell measurement, based on remaining service time (RST) from the end of the service time of the serving cell being longer than the certain time.

The neighbor cell measurement may be performed based on period T, based on the RST from the end of the service time of the serving cell being shorter than a first time threshold.

The neighbor cell measurement may be performed based on longer period than the period T, based on i) the RST from the end of the service time of the serving cell being shorter than the certain time and ii) the RST from the end of the service time of the serving cell being longer than the first time threshold.

The UE may receive, from the NTN satellite, information on service time of a neighbor cell.

The neighbor cell measurement may be performed based on RST from the end of the service time of the neighbor cell.

The UE may skip perform neighbor cell measurement, based on RST from the end of the service time of the neighbor cell being shorter than a second time threshold.

The neighbor cell measurement may be performed based on period T, based on the RST from the end of the service time of the neighbor cell being longer than a third time threshold.

The neighbor cell measurement may be performed based on longer period than the period T, based on i) the RST from the end of the service time of the neighbor cell being longer than the second time threshold and ii) the RST from the end of the service time of the neighbor cell being shorter than the third time threshold.

The UE may receive, from the NTN satellite, a first reference location of the serving cell.

The neighbor cell measurement may be performed based on distance between the UE and the first reference location of the serving cell being bigger than a first distance threshold.

The UE may skip perform neighbor cell measurement, based on the distance between the UE and the first reference location of the serving cell being smaller than the first distance threshold.

The neighbor cell measurement may be performed based on the period T, based on the distance between the UE and the first reference location of the serving cell being bigger than the second distance threshold.

The neighbor cell measurement may be performed based on longer period than the period T, based on i) the distance between the UE and the first reference location of the serving cell being bigger than the first distance threshold and ii) the distance between the UE and the first reference location of the serving cell being smaller than the second distance threshold.

The UE may receive, from the NTN satellite, a second reference location of the neighbor cell.

The neighbor cell measurement may be performed based on distance between the UE and the second reference location of the neighbor cell being smaller than a third distance threshold.

The UE may skip perform neighbor cell measurement, based on the distance between the UE and the first reference location of the neighbor cell being bigger than the third distance threshold, The neighbor cell measurement may be performed based on the period T, based on the distance between the UE and the first reference location of the neighbor cell being smaller than the fourth distance threshold, The neighbor cell measurement may be performed based on longer period than the period T, based on i) the distance between the UE and the first reference location of the neighbor cell being smaller than the third distance threshold and ii) the distance between the UE and the first reference location of the neighbor cell being bigger than the fourth distance threshold.

Figure 17A:
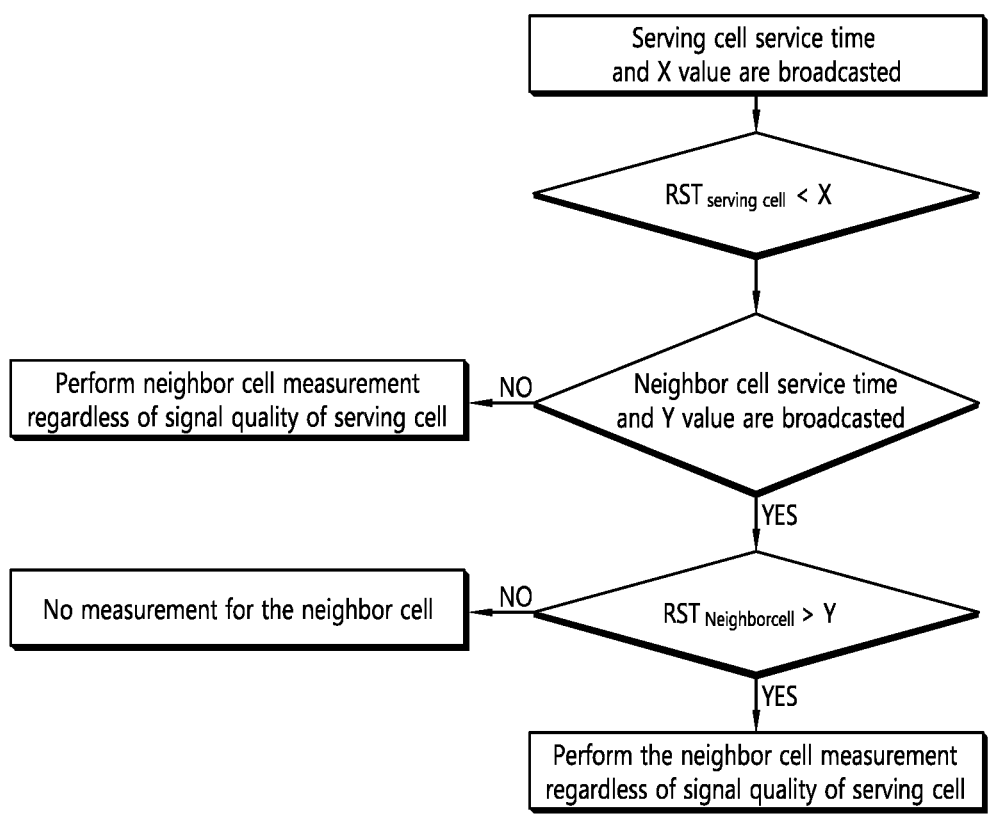
FIG. 17a and FIG. 17b show examples of flowchart for power saving operation according to cell service time with (N, M) values according to an embodiment of the present specification.
Figure 17B:
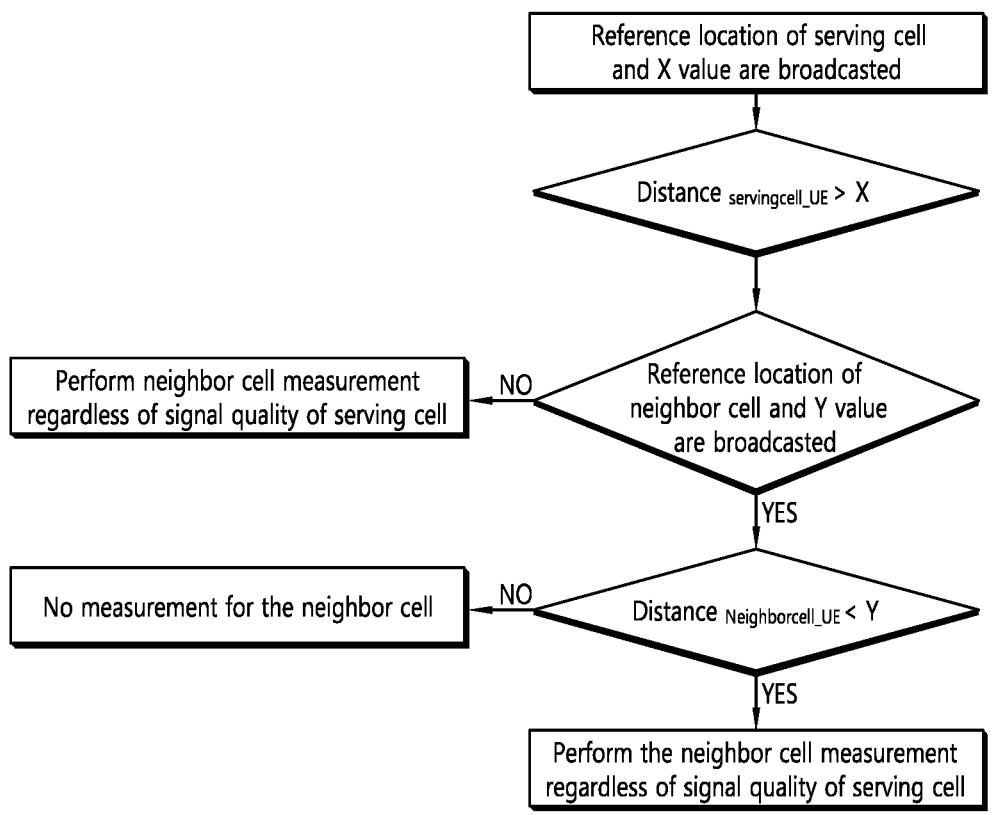

FIG. 17a and FIG. 17b show examples of procedure for neighbor cell measurement according to an embodiment of the present specification.

FIG. 17a and FIG. 17b are a flowchart for an example of neighbor cell measurement when the cell service time or reference location for the serving cell/neighbor cell described above is configured with the X and Y values. The values for X and Y may be given down to the UE from the network as same manner with a cell service time or a reference location (e.g., SIB). X and Y may be updated periodically or aperiodically according to the NTN satellite environment.

FIG. 17a shows flowchart for neighbor cell measurement according to cell service time.

Cell service time of serving cell and X value may be broadcasted.

UE may calculate RST for serving cell based on the cell service time. Then UE may determine whether the RST for serving cell is less than X.

If RST is less than X, UE may check whether there is cell service time of neighbor cell and Y value which are broadcasted.

If there is no cell service time of neighbor cell and Y value, UE may perform neighbor cell measurement regardless of signal quality of serving cell.

If there is cell service time of neighbor cell and Y value, UE may calculate RST for neighbor cell based on the cell service time and may determine whether the RST for neighbor cell is more than Y.

If the RST for neighbor cell is not more than Y, the UE may not operate neighbor cell measurement(that is, no measurement).

If the RST for neighbor cell is more than Y, UE may perform neighbor cell measurement regardless of signal quality of serving cell.

FIG. 17b shows flowchart for neighbor cell measurement according to reference location with X and Y value.

Cell reference location of serving cell and X value may be broadcasted.

UE may calculate the distance from reference location of serving cell based on the cell reference location. Then UE may determine whether the distance from reference location of serving cell is more than X.

If the distance from reference location of serving cell is more than X, UE may check whether there is cell reference location of neighbor cell and Y value which are broadcasted.

If there is no cell reference location of neighbor cell and Y value, UE may perform neighbor cell measurement regardless of signal quality of serving cell.

If there is cell service time of neighbor cell and Y value, UE may calculate the distance from reference location of neighbor cell based on the cell reference location and may determine whether the distance from reference location of neighbor cell is less than Y.

If the distance from reference location of neighbor cell is not less than Y, the UE may not operate neighbor cell measurement(that is, no measurement).

If the distance from reference location of neighbor cell is less than Y, UE may perform neighbor cell measurement regardless of signal quality of serving cell.

Figure 18:
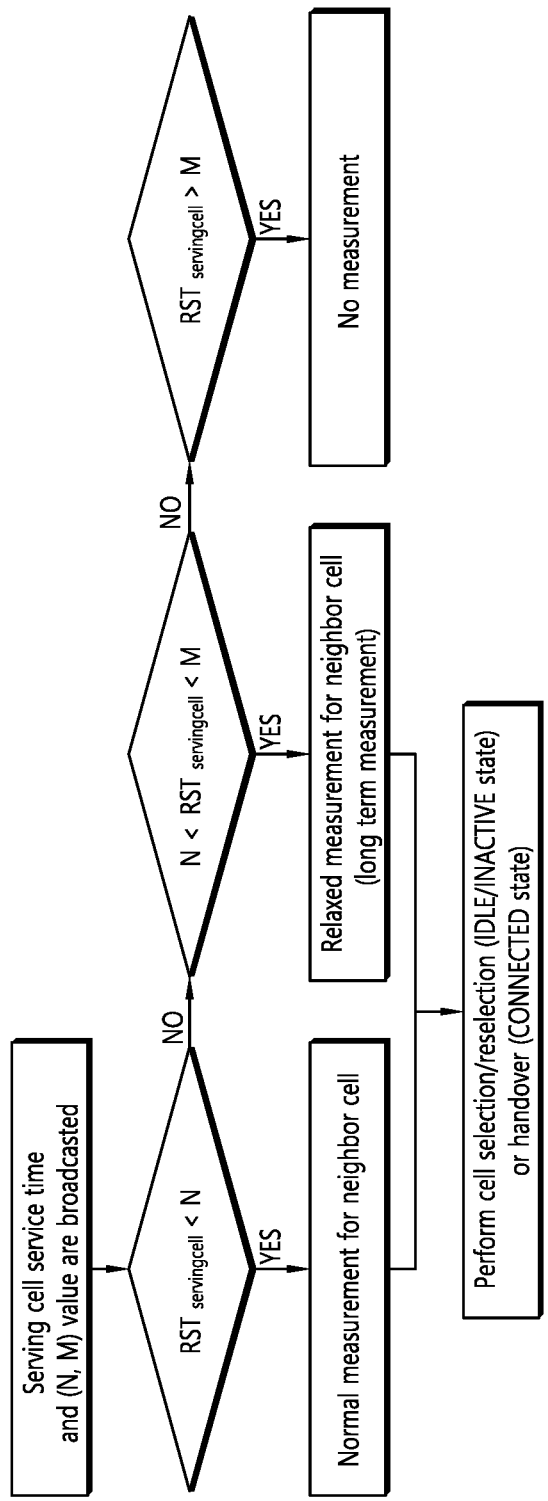
FIG. 18 shows examples of flowchart for power saving operation according to reference location with (N, M) values according to an embodiment of the present specification.

FIG. 18 shows examples of flowchart for power saving operation according to cell service time with (N, M) values according to an embodiment of the present specification.

Cell service time of serving cell and (N, M) value may be broadcasted by network.

UE may calculate RST for serving cell based on the cell service time. UE may compare the RST with N and M.

If the RST is less than N, the UE may operate normally (that is, normal measurement).

If the RST is less than M and more than N, measurement relaxation may be applied to measure neighbor cells.

If the RST is more than M, UE may not perform measurement (no measurement).

If i) measurement is performed by UE, ii) UE is IDLE or INACTIVE state and iii) condition for cell selection or cell reselection, UE may perform cell selection or cell reselection.

If i) measurement is performed by UE, ii) UE is CONNECTED state and iii) condition for cell handover, UE may perform handover.

Figure 19:
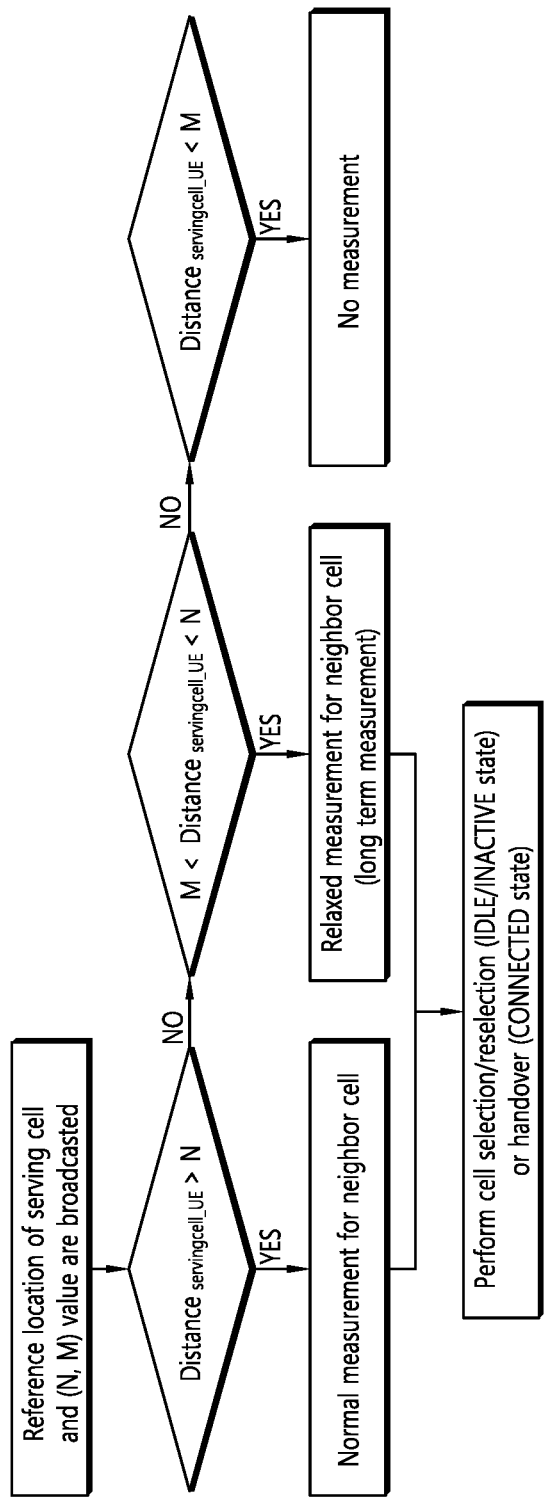
FIG. 19 shows a procedure of UE according to the disclosure of the present specification.

FIG. 19 shows examples of flowchart for power saving operation according to reference location with (N, M) values according to an embodiment of the present specification.

Reference location of serving cell and (N, M) value may be broadcasted by network.

UE may calculate the distance from reference location of serving cell based on the reference location. UE may compare the distance with N and M.

If the distance is more than N, the UE may operate normally (that is, normal measurement).

If the distance is more than M and less than N, measurement relaxation may be applied to measure neighbor cells.

If the distance is less than M, UE may not perform measurement (no measurement).

If i) measurement is performed by UE, ii) UE is IDLE or INACTIVE state and iii) condition for cell selection or cell reselection, UE may perform cell selection or cell reselection.

If i) measurement is performed by UE, ii) UE is CONNECTED state and iii) condition for cell handover, UE may perform handover.

Hereinafter, a device configured to operate in a wireless system, according to some embodiments of the present disclosure, will be described.

For example, a terminal may include a processor, a transceiver, and a memory.

For example, the processor may be configured to be coupled operably with the memory and the processor.

The processor may be configured to: connect to a non-terrestrial network (NTN) satellite serving a targeted service area via a service link, wherein the NTN satellite is connected to a gateway via a feeder link; receive, from the NTN satellite, information on service time of a serving cell; start to perform neighbor cell measurement at a time point before end of the service time of the serving cell by a certain time, regardless of whether a cell quality of the serving cell meets a cell selection criterion S, wherein the NTN satellite provides an earth fixed system, wherein the information on the service time includes information on when the serving cell is going to stop serving the targeted service area, wherein the information on the service time is provided based on a Coordinated Universal Time (UTC).

Hereinafter, an apparatus in a mobile communication, according to some embodiments of the present disclosure, will be described.

The processor may be configured to: connecting to a non-terrestrial network (NTN) satellite serving a targeted service area via a service link, wherein the NTN satellite is connected to a gateway via a feeder link; receiving, from the NTN satellite, information on service time of a serving cell; starting to perform neighbor cell measurement at a time point before end of the service time of the serving cell by a certain time, regardless of whether a cell quality of the serving cell meets a cell selection criterion S, wherein the NTN satellite provides an earth fixed system, wherein the information on the service time includes information on when the serving cell is going to stop serving the targeted service area, wherein the information on the service time is provided based on a Coordinated Universal Time (UTC).

Hereinafter, a non-transitory computer-readable medium has stored thereon a plurality of instructions in a wireless communication system, according to some embodiments of the present disclosure, will be described.

According to some embodiment of the present disclosure, the technical features of the present disclosure could be embodied directly in hardware, in a software executed by a processor, or in a combination of the two. For example, a method performed by a wireless device in a wireless communication may be implemented in hardware, software, firmware, or any combination thereof. For example, a software may reside in RAM memory, flash memory, ROM memory, EPROM memory, EEPROM memory, registers, hard disk, a removable disk, a CD-ROM, or any other storage medium.

Some example of storage medium is coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some embodiment of the present disclosure, a non-transitory computer-readable medium has stored thereon a plurality of instructions. The stored a plurality of instructions may be executed by a processor of UE.

The stored a plurality of instructions may cause the UE to connect to a non-terrestrial network (NTN) satellite serving a targeted service area via a service link, wherein the NTN satellite is connected to a gateway via a feeder link; receive, from the NTN satellite, information on service time of a serving cell; start to perform neighbor cell measurement at a time point before end of the service time of the serving cell by a certain time, regardless of whether a cell quality of the serving cell meets a cell selection criterion S, wherein the NTN satellite provides an earth fixed system, wherein the information on the service time includes information on when the serving cell is going to stop serving the targeted service area, wherein the information on the service time is provided based on a Coordinated Universal Time (UTC).

The present disclosure can have various advantageous effects.

For example, by performing cell measurement based on service time or reference location, power saving for UE is efficiently performed.

Advantageous effects obtained through specific examples of the present specification are not limited to the effects listed above. For example, there may be a variety of technical effects that a person having ordinary skill in the related art can understand or derive from this specification. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method for radio communication, performed by user equipment (UE), comprising:
   wherein the UE is served by a non-terrestrial network (NTN) satellite in a target service area,
   receiving, from the NTN satellite, service time of a serving cell,
   wherein the service time of the serving cell indicates time information on when the serving cell is going to stop serving the targeted service area;
   starting to perform neighbor cell measurement before the service time regardless of whether a cell quality of the serving cell meets a cell selection criterion S, based on the UE receiving the service time of the serving cell,
   wherein the NTN satellite provides an earth fixed system,
   wherein the information on the service time is provided based on a Coordinated Universal Time (UTC).

2. The method of claim 1,
   wherein the UE skips perform the neighbor cell measurement, based on remaining service time (RST) to the service time of the serving cell being longer than a certain time,
   wherein the neighbor cell measurement is performed based on period T, based on the RST to the service time of the serving cell being shorter than a first time threshold,
   wherein the neighbor cell measurement is performed based on longer period than the period T, based on i) the RST to the service time of the serving cell being shorter than the certain time and ii) the RST to the service time of the serving cell being longer than the first time threshold.

3. The method of claim 1, further comprising:
   receiving, from the NTN satellite, service time of a neighbor cell;
   wherein the neighbor cell measurement is performed based on RST to the service time of the neighbor cell.

4. The method of claim 3,
   wherein the UE skips perform neighbor cell measurement, based on the RST to the service time of the neighbor cell being shorter than a second time threshold,
   wherein the neighbor cell measurement is performed based on period T, based on the RST to the service time of the neighbor cell being longer than a third time threshold,
   wherein the neighbor cell measurement is performed based on longer period than the period T, based on i) the RST to the service time of the neighbor cell being longer than the second time threshold and ii) the RST to the service time of the neighbor cell being shorter than the third time threshold.

5. The method of claim 1, further comprising:
   receiving, from the NTN satellite, information on a first reference location of the serving cell;
   wherein the neighbor cell measurement is performed based on distance between the UE and the first reference location of the serving cell being bigger than a first distance threshold.

6. The method of claim 5,
   wherein the UE skips perform the neighbor cell measurement, based on the distance between the UE and the first reference location of the serving cell being smaller than the first distance threshold,
   wherein the neighbor cell measurement is performed based on the period T, based on the distance between the UE and the first reference location of the serving cell being bigger than a second distance threshold,
   wherein the neighbor cell measurement is performed based on longer period than the period T, based on i) the distance between the UE and the first reference location of the serving cell being bigger than the first distance threshold and ii) the distance between the UE and the first reference location of the serving cell being smaller than the second distance threshold.

7. The method of claim 1, further comprising:
   receiving, from the NTN satellite, information on a second reference location of the neighbor cell;
   wherein the neighbor cell measurement is performed based on distance between the UE and the second reference location of the neighbor cell being smller than a third distance threshold.

8. The method of claim 7,
   wherein the UE skips perform the neighbor cell measurement, based on the distance between the UE and the second reference location of the neighbor cell being bigger than the third distance threshold,
   wherein the neighbor cell measurement is performed based on the period T, based on the distance between the UE and the second reference location of the neighbor cell being smaller than a fourth distance threshold,
   wherein the neighbor cell measurement is performed based on longer period than the period T, based on i) the distance between the UE and the second reference location of the neighbor cell being smaller than the third distance threshold and ii) the distance between the UE and the second reference location of the neighbor cell being bigger than the fourth distance threshold.

9. The method of claim 1,
   wherein the cell quality of the serving cell is Srxlev or Squal,
   wherein that the cell quality of the serving cell meets the cell selection criterion S is i) that the Srxlev is larger than SIntraSearchP and the Squal is larger than SIntraSearchQ or ii) that the Srxlev is larger than Snon-IntraSearchP and the Squal is larger than SnonIntraSearchQ.

10. A device configured to operate in a wireless system, the device comprising:
    a transceiver,
    a processor operably connectable to the transceiver,
    wherein the processer is configured to:
    wherein the device is served by a non-terrestrial network (NTN) satellite in a target service area,
    receiving, from the NTN satellite, service time of a serving cell,
    wherein the service time of the serving cell indicates time information on when the serving cell is going to stop serving the targeted service area;
    starting to perform neighbor cell measurement before the service time regardless of whether a cell quality of the serving cell meets a cell selection criterion S, based on the device receiving the service time of the serving cell,
    wherein the NTN satellite provides an earth fixed system,
    wherein the information on the service time is provided based on a Coordinated Universal Time (UTC).

11. At least one non-transitory computer readable medium (CRM) storing instructions that, based on being executed by at least one processor, perform operations comprising:
    wherein a UE is served by a non-terrestrial network (NTN) satellite in a target service area,
    receiving, from the NTN satellite, service time of a serving cell,
    wherein the service time of the serving cell indicates time information on when the serving cell is going to stop serving the targeted service area;
    starting to perform neighbor cell measurement before the service time regardless of whether a cell quality of the serving cell meets a cell selection criterion S, based on the UE receiving the service time of a serving cell,
    wherein the NTN satellite provides an earth fixed system,
    wherein the information on the service time is provided based on a Coordinated Universal Time (UTC).

* * * * *